US008458006B2

(12) United States Patent  (10) Patent No.: US 8,458,006 B2
Araki et al.  (45) Date of Patent: *Jun. 4, 2013

(54) PRODUCT DEVELOPMENT PROCESS SUPPORTING SYSTEM AND PRODUCT DEVELOPMENT PROCESS SUPPORTING METHOD

(75) Inventors: Katsufumi Araki, Tokyo (JP); Isao Nagatomi, Tokyo (JP); Atau Shihota, Tokyo (JP); Takeo Karasawa, Minato-ku (JP)

(73) Assignee: ITID Consulting, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,003

(22) Filed: May 25, 2012

(65) Prior Publication Data

US 2012/0239446 A1  Sep. 20, 2012

Related U.S. Application Data

(63) Continuation of application No. 12/067,500, filed as application No. PCT/JP2006/318341 on Sep. 15, 2006, now Pat. No. 8,209,212.

(30) Foreign Application Priority Data

Oct. 14, 2005 (JP) ................. 2005-300377

(51) Int. Cl.
*G06Q 10/00* (2012.01)
(52) U.S. Cl.
USPC .......................... 705/7.25; 705/7.29; 705/7.36
(58) Field of Classification Search
None
See application file for complete search history.

(56) References Cited

U.S. PATENT DOCUMENTS

| | | | |
|---|---|---|---|
| 7,280,986 | B2 | 10/2007 | Goldberg et al. |
| 2001/0029461 | A1 | 10/2001 | Kobayashi |
| 2002/0129346 | A1 | 9/2002 | Lee et al. |
| 2003/0055695 | A1 | 3/2003 | Mori et al. |

FOREIGN PATENT DOCUMENTS

| | | |
|---|---|---|
| JP | 2003-30395 | 1/2003 |
| JP | 2003-141314 | 5/2003 |
| JP | 2003-178173 | 6/2003 |
| JP | 2004-280249 | 10/2004 |

OTHER PUBLICATIONS

Chen et al., "Information Deduction Approach Through Quality Function Deployment for the Quantification of the Dependency Between Design Tasks", International Journal of Production Research, vol. 42, No. 21, pp. 4623-4637 (Nov. 2004).

(Continued)

*Primary Examiner* — Jonathan G Sterrett
(74) *Attorney, Agent, or Firm* — Greenblum & Bernstein, P.L.C.

(57) ABSTRACT

Wasteful repetitive tasks are easily reduced in processes to develop complex products. A product development process support system is a system which analyzes dependencies between a plurality of requirements in product development processes belonging to a plurality of layers, and comprises an input reception portion for receiving input of information indicating the dependency between two requirements belonging to adjacent layers and of information indicating the degree of influence of requirements on product development, and dependency derivation portion for deriving the dependency between two arbitrary requirements belonging to the same layer from information indicating the dependencies between the two requirements in question and other requirements received by the input reception portion and from information indicating the degree of influence of the two requirements in question, based on dependency derivation rules established in advance.

4 Claims, 23 Drawing Sheets

OTHER PUBLICATIONS

Adachi, No. 1: Basic of DSM, 'The "DSM" Method of Development Process Reform', Nikkei Digital Engineering, Nikkei BP, No. 74, pp. 104-107 (Jan. 2004).

Adachi, No. 2: 'Procedures and Pointers in DSM Analysis, The "DSM" Method of Development Process Reform', Nikkei Digital Engineering, Nikkei BP, No. 75, pp. 106-111 (Feb. 2004).

Kondo et al., "Cooperative Mechatronics Design Based on Design Task Analysis and Knowledge Sharing", Toshiba Review, Toshiba Ltd., vol. 54. No. 9, pp. 16-20, (Sep. 1999).

English language translation of: Adachi, No. 1: 'Basic of DSM, The "DSM" Method of Development Process Reform', Nikkei Digital Engineering, Nikkei BP, No. 74, pp. 104-107 (Jan. 2004).

English language translation of: Adachi, No. 2: 'Procedures and Pointers in DSM Analysis, The "DSM" Method of Development Process Reform', Nikkei Digital Engineering, Nikkei BP, No. 75, pp. 106-111, (Feb. 2004).

English language translation of: Kondo et al., "Cooperative Mechatronics Design Based on Design Task Analysis and Knowledge Sharing", Toshiba Review, Toshiba Ltd., vol. 54. No. 9, pp. 16-20 (Sep. 1999).

Fig.4

MODULE A FUNCTION REQUIREMENTS VS DESIGN ELEMENTS (SOURCES)

| Function Requirements | FUNCTION IMPORTANCE | RISK OF NONATTAINMENT | PRIORITY (0 TO 1) | AE1 HEATING ROLLER: HEATER | AE2 HEATING ROLLER: SLEEVE | AE3 HEATING ROLLER: RUBBER LAYER | AE4 HEATING ROLLER: BEARINGS | AE5 HEATING ROLLER: SUPPORT MEMBER | AE6 PRESSURE: PRESSURE ROLLER | AE7 PRESSURE: SUPPORT MEMBER | AE8 PRESSURE: BEARINGS | AE9 SEPARATION CLAW | AE10 CONTROL: THERMISTOR | AE11 CONTROL: THERMOSTAT | AE12 CONTROL: CONTROL PORTION | AE13 CONTROL: POWER SUPPLY | AE14 DRIVING: MOTOR | AE15 DRIVING: GEAR | AE16 HOUSING | AE17 PAPER GUIDE | AE18 MEDIA | AE19 TONER | AE20 USAGE STATE |
|---|---|---|---|---|---|---|---|---|---|---|---|---|---|---|---|---|---|---|---|---|---|---|---|
| AF1 WARMUP TIME | 5 | 5 | 1.0 | 9 | 9 | 9 |  |  | 9 |  |  |  | 3 |  | 6 | 9 |  |  | 3 |  |  |  | 3 |
| AF2 FIXING PROPERTIES | 5 | 5 | 1.0 | 9 | 9 | 9 |  | 9 | 9 | 9 |  | 9 | 3 |  | 9 | 9 |  |  | 3 |  | 9 | 9 | 6 |
| AF3 PRINTING LINES | 4 | 3 | 0.5 |  | 9 | 9 |  | 9 | 9 | 9 |  | 9 | 9 |  |  |  |  |  |  |  | 9 | 9 |  |
| AF4 PAPER WRINKLES | 4 | 3 | 0.5 | 3 | 9 | 9 |  |  | 9 |  | 3 | 9 | 3 |  | 3 | 3 | 3 |  | 3 | 3 | 9 | 3 | 3 |
| AF5 PAPER WINDING | 5 | 4 | 0.8 |  | 9 | 9 |  | 6 | 9 | 9 | 3 | 6 |  |  | 6 | 9 | 3 |  |  | 6 | 9 | 3 | 3 |
| AF6 PAPER CURLING | 3 | 3 | 0.4 | 9 | 6 | 9 |  |  | 9 |  |  | 6 |  |  | 9 | 9 |  |  | 3 | 9 | 9 | 9 | 3 |
| AF7 PAPER JAMS | 4 | 2 | 0.5 |  |  | 9 | 3 |  | 9 | 6 | 3 | 6 | 3 |  | 3 | 3 | 3 | 9 |  | 3 | 9 |  | 6 |
| AF8 PAPER STRETCHING | 3 | 2 | 0.2 |  | 9 | 9 |  | 6 | 9 |  |  | 6 | 9 | 3 | 3 |  | 9 | 9 |  |  | 9 | 6 | 3 |
| AF9 DURABILITY | 4 | 4 | 0.6 |  |  | 3 |  |  |  |  |  |  |  |  |  |  |  |  |  |  |  |  |  |
| AF10 WEIGHT | 3 | 2 | 0.2 |  |  | 9 |  |  | 9 |  |  | 3 | 3 | 3 | 3 | 8 | 6 | 6 | 8 | 3 | 9 |  |  |
| AF11 SHAPE | 5 | 4 | 0.4 |  | 6 | 9 |  |  | 6 | 3 | 3 | 6 | 3 | 3 | 3 | 8 | 3 | 6 | 6 |  |  |  |  |
| AF12 COST | 3 | 2 | 0.5 |  | 9 | 3 | 3 | 3 | 9 |  |  | 6 | 3 | 3 | 9 | 8 | 6 | 6 | 6 | 6 | 9 | 9 | 3 |
| AF13 MAINTENANCE | 3 | 4 | 0.4 | 9 | 9 | 9 | 3 | 3 | 9 |  |  | 9 | 3 | 3 | 9 | 9 |  | 3 | 3 |  | 9 | 9 | 3 |
| AF14 PREVENTING OF SMOKE, FIRE | 5 | 2 | 0.4 | 3 | 3 | 3 | 3 |  | 3 |  |  | 3 | 3 | 3 | 3 | 3 |  | 3 | 3 |  | 3 | 3 | 3 |
| AF15 POWER CONSUMPTION | 5 | 3 | 0.6 | 3 | 3 | 3 |  |  | 3 |  |  |  | 3 |  |  | 3 |  |  | 3 | 3 | 3 | 3 | 1 |
| DEGREE OF ADJUSTMENT (0 TO 1) | | | | 0.4 | 0.6 | 0.5 | 0.2 | 0.4 | 0.8 | 0.4 | 0.2 | 0.5 | 0.2 | 0.1 | 0.5 | 0.1 | 0.2 | 0.3 | 0.3 | 0.6 | 0.1 | 0.2 | 0.1 |
| ELEMENT RISK | | | | 3 | 3 | 3 | 2 | 2 | 4 | 2 | 2 | 3 | 2 | 1 | 3 | 1 | 2 | 2 | 3 | 3 | 3 | 3 | 3 |
| FREEDOM OF MODIFICATION | | | | 3 | 4 | 5 | 5 | 5 | 5 | 5 | 3 | 5 | 3 | 2 | 5 | 3 | 3 | 4 | 4 | 5 | 1 | 2 | 1 |

Fig.5

| DEPENDENCY | EXPLANATION |
|---|---|
| 9 | THE MODULE DESIGN ELEMENT HAS A STRONG DEPENDENCY (SENSITIVITY) ON ATTAINMENT OF THE MODULE FUNCTION REQUIREMENT. IF THERE IS MODIFICATION OF THE MODULE DESIGN ELEMENT, HARMFUL EFFECTS ON ATTAINMENT OF THE MODULE FUNCTION REQUIREMENT WILL ALMOST ALWAYS OCCUR. |
| 6 | THE MODULE DESIGN ELEMENT HAS A COMPARATIVELY STRONG DEPENDENCY (SENSITIVITY) ON ATTAINMENT OF THE MODULE FUNCTION REQUIREMENT. IF THERE IS MODIFICATION OF THE MODULE DESIGN ELEMENT, THE PROBABILITY OF HARMFUL EFFECTS ON ATTAINMENT OF THE MODULE FUNCTION REQUIREMENT IS ABOUT 50%. |
| 3 | THE MODULE DESIGN ELEMENT HAS A WEAK BUT NON-NEGLIGIBLE DEPENDENCY (SENSITIVITY) ON ATTAINMENT OF THE MODULE FUNCTION REQUIREMENT. IF THERE IS MODIFICATION OF THE MODULE DESIGN ELEMENT, THERE ARE CASES IN WHICH HARMFUL EFFECTS ON ATTAINMENT OF THE MODULE FUNCTION REQUIREMENT MAY OCCUR. |
| NONE | THE DEPENDENCY OF THE MODULE DESIGN ELEMENT ON THE MODULE FUNCTION REQUIREMENT (SENSITIVITY) CAN BE IGNORED. WHEN MODIFICATION OF THE MODULE DESIGN ELEMENT OCCURS, THERE IS NO OCCURRENCE OF HARMFUL EFFECTS ON ATTAINMENT OF THE MODULE FUNCTION REQUIREMENT. |

| SAMPLE CASE | ELEMENT 1 | ELEMENT 2 | ELEMENT 3 | ELEMENT 4 | ELEMENT 5 | ELEMENT 6 | ELEMENT 7 | ELEMENT 8 | ELEMENT 9 | ELEMENT 10 |
|---|---|---|---|---|---|---|---|---|---|---|
| ELEMENT 1 | | | | | | | | | | |
| ELEMENT 2 | 1 | | 2 | | | | | | | |
| ELEMENT 3 | | 3 | | | | | 3 | 3 | | 2 |
| ELEMENT 4 | | | | | 1 | 1 | | | | |
| ELEMENT 5 | | | | 3 | | | 2 | 1 | | 2 |
| ELEMENT 6 | | | | 3 | | | 3 | | | |
| ELEMENT 7 | | | 3 | | | 2 | | 2 | | |
| ELEMENT 8 | | | 3 | 1 | | 3 | | | | |
| ELEMENT 9 | | 1 | 1 | | | | | | | |
| ELEMENT 10 | | 1 | 3 | 1 | | | 2 | 1 | | |

*Fig.14*

| SAMPLE CASE | ELEMENT 1 | ELEMENT 4 | ELEMENT 2 | ELEMENT 3 | ELEMENT 7 | ELEMENT 8 | ELEMENT 6 | ELEMENT 10 | ELEMENT 5 | ELEMENT 9 |
|---|---|---|---|---|---|---|---|---|---|---|
| ELEMENT 1 | | | | | | | | | | |
| ELEMENT 4 | | | | | | | | 1 | 1 | |
| ELEMENT 2 | 1 | | | 2 | | | | | | |
| ELEMENT 3 | | | 3 | | 3 | 3 | | 2 | | |
| ELEMENT 7 | | | | 3 | | 2 | 2 | | | |
| ELEMENT 8 | | | | 3 | 3 | | | | 1 | |
| ELEMENT 6 | | 3 | | | 3 | | | | | |
| ELEMENT 10 | | 1 | 1 | 3 | 2 | 1 | | | | |
| ELEMENT 5 | | 3 | | | 2 | 1 | | 2 | | |
| ELEMENT 9 | | 1 | 1 | | | | | | | |

Fig. 15

Fig. 16 MODULE A FUNCTION REQUIREMENTS VS DESIGN ELEMENTS (AFTER ANALYSIS)

| Design Element \ Function | AF2 FIXING PROPERTIES | AF1 WARMUP TIME | AF5 PAPER WINDING | AF9 DURABILITY | AF4 PAPER WRINKLES | AF15 POWER CONSUMPTION | AF7 PAPER JAMS | AF3 PRINTING LINES | AF6 PAPER CURLING | AF14 PREVENTING OF SMOKE, FIRE | AF12 COST | AF8 PAPER STRETCHING | AF10 WEIGHT | AF11 SHAPE | AF13 MAINTENANCE | DEGREE OF ADJUSTMENT (0 TO 1) | ELEMENT RISK | FREEDOM OF MODIFICATION |
|---|---|---|---|---|---|---|---|---|---|---|---|---|---|---|---|---|---|---|
| AE13 CONTROL PORTION: POWER SUPPLY | 9 | 9 | 9 | 9 | | 9 | | | 9 | 9 | 9 | 3 | | | | 0.1 | 1 | 3 |
| AE8 PRESSURE PORTION: BEARINGS | | | | 3 | | 3 | | | | 3 | | | | | | 0.2 | 2 | 3 |
| AE4 HEATING ROLLER PORTION: BEARINGS | | | | 3 | | | | | | 3 | | | | | | 0.2 | 2 | 3 |
| AE16 HOUSING | 3 | 3 | 3 | | 3 | | | | | 3 | 9 | 3 | 9 | 9 | 6 | 0.5 | 3 | 4 |
| AE7 PRESSURE PORTION: SUPPORT MEMBER | | | | 6 | | 6 | 6 | | | 3 | | 6 | | | | 0.4 | 2 | 5 |
| AE5 HEATING ROLLER PORTION: SUPPORT MEMBER | | | | 6 | | 6 | 6 | | | 3 | | 6 | | | | 0.4 | 2 | 5 |
| AE17 PAPER GUIDE | | | 3 | | | | 9 | 6 | 3 | | | | | | 6 | 0.5 | 3 | 5 |
| AE10 CONTROL PORTION: THERMISTOR | 3 | 3 | 3 | 9 | | 3 | | 9 | | 3 | 9 | 3 | | | 3 | 0.2 | 2 | 3 |
| AE15 DRIVING PORTION: GEAR | | | | 9 | | 3 | | | | | 9 | 6 | | | 3 | 0.3 | 2 | 4 |
| AE12 CONTROL PORTION: CONTROL PORTION | 9 | 6 | 9 | 3 | | 9 | 6 | | | 9 | 3 | 9 | | | | 0.6 | 3 | 5 |
| AE3 HEATING ROLLER PORTION: RUBBER LAYER | 9 | 9 | 9 | 9 | 9 | 9 | 9 | 9 | 9 | 9 | 9 | | 3 | 3 | | 0.5 | 3 | 5 |
| AE9 SEPARATION CLAW | | | 9 | 6 | | | 9 | 9 | 6 | 9 | 3 | | | | 6 | 0.5 | 3 | 5 |
| AE6 PRESSURE PORTION: PRESSURE ROLLER | 9 | 6 | 9 | 9 | 9 | 6 | 9 | 3 | 9 | 9 | 6 | 9 | 3 | | 6 | 0.8 | 4 | 5 |
| AE2 HEATING ROLLER PORTION: SLEEVE | 9 | 9 | 9 | 6 | 9 | 9 | 9 | 6 | 9 | 9 | 9 | | 6 | 3 | | 0.5 | 3 | 4 |
| AE1 HEATING ROLLER PORTION: HEATER | 9 | 9 | 9 | 9 | | 9 | | | | 9 | 6 | 9 | | | | 0.4 | 3 | 3 |
| AE19 TONER | 9 | | 9 | | | 3 | | | | 9 | | 9 | | | | 0.2 | 3 | 2 |
| AE14 DRIVING PORTION: MOTOR | | | | 9 | | | 3 | | | | | 6 | | | 3 | 0.2 | 2 | 3 |
| AE20 USAGE STATE | 6 | 3 | 3 | 3 | 3 | 3 | 6 | | 3 | 3 | | 3 | | | | 0.1 | 3 | 1 |
| AE18 MEDIA | 9 | | 9 | 3 | 9 | 3 | 9 | | 8 | 8 | | 9 | | | | 0.1 | 3 | 1 |
| AE11 CONTROL PORTION: THERMOSTAT | | | | | | | | | | 9 | 3 | | | | 3 | 0.1 | 1 | 2 |
| PRIORITY (0 TO 1) | 1.0 | 1.0 | 0.8 | 0.6 | 0.5 | 0.6 | 0.5 | 0.5 | 0.4 | 0.4 | 0.5 | 0.2 | 0.2 | 0.4 | 0.4 | | | |
| RISK OF NONATTAINMENT | 5 | 5 | 4 | 4 | 3 | 3 | 3 | 3 | 2 | 4 | 2 | 2 | 2 | 3 | | | | |
| FUNCTION IMPORTANCE | 5 | 5 | 5 | 4 | 4 | 5 | 4 | 4 | 3 | 5 | 3 | 3 | 3 | 5 | 3 | | | |

PRODUCT DEVELOPMENT PROCESS SUPPORTING SYSTEM AND PRODUCT DEVELOPMENT PROCESS SUPPORTING METHOD

CROSS-REFERENCE TO RELATED APPLICATIONS

The present application is a continuation application of pending U.S. application Ser. No. 12/067,500, filed Apr. 30, 2008, which is a National Phase Application of PCT/JP2006/318341, filed Sep. 15, 2006, the contents of which are expressly incorporated by reference herein in their entireties.

METHOD

1. Technical Field

This invention relates to a product development process support system, and product development process support method, to analyze the dependencies between a plurality of requirements in product development processes, belonging to any of a plurality of layers.

2. Background Art

In product development processes, the Quality Function Deployment (QFD) method is a method used to break down higher-ranking development requirements with respect to marketing (customer requests, system requirements) into requirements by each design item of the product. For example, in development of industrial products such as automobiles and digital photocopiers, the product is deployed into numerous modules and components in order to achieve higher-ranking development requirements. In QFD, the dependencies between higher- and lower-ranking requirements (between higher-ranking development requirements and the requirements of design items for modules and components) are organized, and based on this organization, the details of design item requirements for each module and component are decided. Based on these decisions, each module and component is designed by numerous design personnel and verification personnel for each design item.

On the other hand, the Design Structure Matrix (DSM) method is a method for organizing the relations between design items of deployed modules and components. Using the DSM method, it is possible to ascertain the type of collaboration between the design items (design personnel and verification personnel) for modules and components (see for example Patent Document 1 below).

Patent Document 1: Japanese Patent Laid-open No. 2004-280249

DISCLOSURE OF THE INVENTION

Problem to be Solved by the Invention

In the QFD method, higher-ranking requirements are deployed reasonably, and if there is no risk at all for individual designs, no design-related problems occur. However, in general contradictions occur in the deployment of higher-ranking requirements, or there are risks in the elements of design items, so that it is frequently the case that some modules or components cannot attain the breakdown requirements.

In this case, the requirements of modules and components for which requirements could not be attained must be reviewed and the design modified, making adjustments with the designs of other modules and other components, so that targets can be attained. Thus when using the QFD method, there is the concern that, due to both internal factors and external factors, it may frequently be necessary to repeat such wasteful tasks as designing and reviewing designs which have already been decided.

In order to avoid such situations, smooth cooperation in tasks among design items (design personnel and verification personnel) for each of the deployed modules and components is necessary. However, in the QFD method, even when the dependency between higher- and lower-ranking requirements can be ascertained, it is difficult to ascertain the relation between requirements for design items of deployed modules and components.

On the other hand, in the above-described DSM method, the relationships between requirements for the design items of deployed modules and components can be organized, but it is necessary to describe the individual dependencies between requirements. Once the individual dependencies between requirements can be described, necessary cooperation can be ascertained, and wasteful repetitive tasks can be avoided. However, description of the individual dependencies between requirements becomes extremely difficult as products become more complex, and actual adoption of this method is not realistic.

This invention was devised in order to resolve the above problems, and has as an object the provision of a product development process support system and product development process support method which enable easy reduction of wasteful repetitive tasks in processes to develop complex products.

Means for Solving the Problem

A product development process support system of this invention is a product development process support system which analyzes the dependencies between a plurality of requirements belonging to any of a plurality of layers in product development processes, and is characterized in comprising input reception means, for receiving input of information indicating the dependency between two requirements belonging to adjacent layers and of information indicating the degree of influence of requirements on product development, and dependency derivation means, for deriving the dependency between two arbitrary requirements belonging to the same layer from information indicating the dependencies between the two requirements in question and other requirements received by the input reception means and from information indicating the degree of influence of the two requirements in question, based on dependency derivation rules, established in advance. Here, a "layer" indicates the specific level like a system requirement, module function requirement, or similar in product development processes. A "requirement" is a specification to be attained on a certain level.

In a product development process support system of this invention, the dependency between two arbitrary requirements belonging to the same layer can be derived from easily input information indicating the dependencies between two requirements belonging to adjacent layers and information indicating the degree of influence of requirements on product development. Hence the dependency between two arbitrary requirements belonging to the same layer can be derived from information which can easily be input. A user can reference this dependency and can make decisions relating to requirements in product development processes which can prevent wasteful repetitive tasks. By this means, wasteful repetitive tasks in processes to develop complex product can easily be decreased.

It is desirable that a product development process support system further comprise analysis means, for deciding the priority order of requirements belonging to the same layer in product development processes and for partitioning the requirements in question, from dependencies derived by the dependency derivation means, based on analysis rules established in advance. By means of this configuration, decisions can be made relating to requirements in product development processes in a desirable sequence and classifications, with respect to preventing wasteful repetitive tasks.

It is desirable that the input reception means receives input of information indicating dependencies in the form of QFD tables, and that the dependency derivation means derives dependencies according to DSM tables. Here, QFD tables and DSM tables are tables comprising matrices used in the QFD method and in the DSM method respectively. By means of this configuration, analysis methods of the QFD method and the DSM method can be applied, and the invention can be implemented more reliably.

While this invention can be described as an invention of a product development process support system, as explained above, the invention can also be described as an invention of a product development process support method, as explained below. These differ only in category, and are in essence the same invention, with similar actions and advantageous results.

A product development process support method of this invention is a product development process support method for analyzing the dependencies between a plurality of requirements belonging to any of a plurality of layers in product development processes, and is characterized in having a step of receiving input of information indicating the dependency between two requirements belonging to adjacent layers and of information indicating the degree of influence of requirements on product development, and a step of deriving the dependency between two arbitrary requirements belonging to the same layer from information indicating the dependencies between the two requirements in question and other requirements received in the input reception step and from information indicating the degree of influence of the two requirements in question, based on dependency derivation rules, established in advance.

Effects of the Invention

By means of this invention, the dependency between two arbitrary requirements belonging to the same layer can be derived from information which can easily be input. A user can reference these dependencies and make decisions relating to requirements in product development processes which can prevent wasteful repetitive tasks. By this means, wasteful repetitive tasks in processes to develop complex products can easily be decreased.

BRIEF DESCRIPTION OF THE DRAWINGS

FIG. 4 is a drawing showing a QFD table serving as an input form in an embodiment.

FIG. 5 is a drawing explaining numerical values showing the extent of dependencies.

FIG. 6 is a drawing showing a DSM table in processing in an embodiment.

FIG. 11 is a drawing showing a sample DSM table, used to explain partition analysis.

FIG. 14 is a drawing showing a DSM table after partition analysis of a sample DSM table.

FIG. 15 is a drawing showing a DSM table after partition analysis of a DSM table of an embodiment.

FIG. 16 is a drawing showing a QFD table converted using a DSM table after partition analysis.

FIG. 17 is a drawing showing QFD tables when layers are in three stages.

FIG. 18 is a drawing showing a DSM table when layers are in three stages.

FIG. 19 is a drawing showing a DSM table when layers are in three stages.

FIG. 22 is a drawing showing a DSM table after partition analysis when layers are in three stages.

FIG. 23 is a drawing showing a QFD table converted using a DSM table after partition analysis when layers are in three stages.

EXPLANATION OF SYMBOLS

10: product development process support system, 11: input/output interface, 12: input reception portion, 13: dependency derivation portion, 14: analysis portion.

BEST MODE FOR CARRYING OUT THE INVENTION

Below, preferred embodiments of a product development process support system and product development process support method of this invention, as well as the drawings, are explained in detail. In explanations of the drawings, the same elements are assigned the same symbols, and redundant explanations are omitted.

Figure 1:
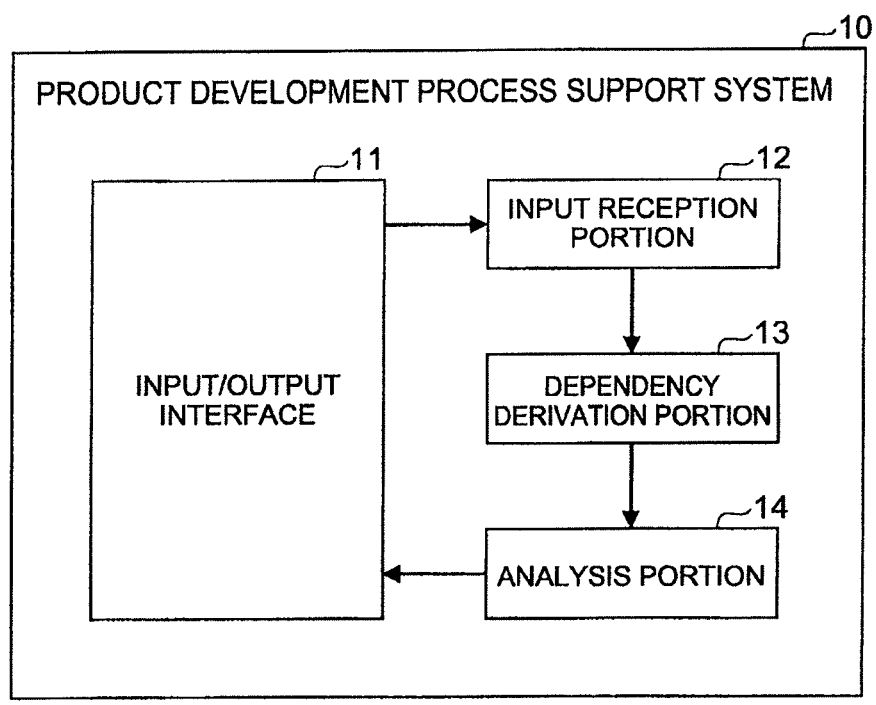
FIG. 1 is a configuration diagram of the product development process support system of an embodiment of the invention.

FIG. 1 shows a product development process support system 10 of one embodiment. The product development process support system 10 is a system which analyzes dependencies between a plurality of requirements in product development processes, and supports product development processes. Here "product development processes" are a series of processes in which marketing-related higher-ranking development requirements (customer requests, system requirements) are used to decide on module function requirements for a product to be developed, and the module functions thus decided are used to decide design elements. As shown in FIG.

2, such product development processes are divided into a plurality of layers, which are "system requirements", "module function requirements", and "module design elements"; each individual requirement belongs to one of these layers. Moreover, requirements in the "module function requirements" layer are the result of a breakdown of the requirements in the "system requirements" layer, and requirements in the "module design elements" layer are the result of a breakdown of the requirements in the "module function requirements" layer, so that layers are in adjacency relationships.

Specifically, for example, in printer development processes, the above requirements may be as follows. Requirements in the "system requirements" layer are equivalent to such requirements as "print quality is good" and "printing is fast". More specifically, for example, the requirement "print quality is good" is a target specification relating to the degree of satisfaction a user of the printer would wish to obtain relating to print quality. Requirements in the "module function requirements" layer are for example defined for each module, and specifically are, for the module of the printing portion, equivalent to "warmup time", "fixing properties", and similar. Still more specifically, for example, a requirement relating to "warmup time" might be a target specification of the time required for warmup operation of the module. Requirements in the "module design elements" layer are equivalent to "heater of the heated roller portion", "pressurizing roller of the pressing portion", and similar. Still more specifically, for example, a requirement relating to the "heater" might be target specifications indicating that the heater be, specifically, of certain dimensions or a certain material.

The product development process support system 10 analyzes the dependencies between a plurality of requirements in product development processes. More specifically, information indicating dependencies between two requirements belonging to two adjacent layers, and information indicating the degree of influence of requirements on product development, are taken as input, and the dependency between two arbitrary requirements belonging to the same layer is derived.

The product development process support system 10 comprises a workstation, PC (Personal Computer), or similar, comprising a CPU (Central Processing Unit), memory, and other hardware. Processing in the product development process support system 10 is performed by executing a product development process support method for information processing by the product development process support system 10. In the product development process support system 10, by causing the above hardware to operate by means of a program or similar, the functions described below of the product development process support system 10 are manifested, and the above information processing is executed. In this embodiment, the product development process support system 10 is realized by means of a single device; but the various functions of the product development process support system 10 may be realized by an information processing system formed by interconnecting a plurality of distributed information processing devices over a network.

As shown in FIG. 1, the product development process support system 10 comprises an input/output interface 11, input reception portion 12, dependency derivation portion 13, and analysis portion 14. The input/output interface 11 comprises an input interface and an output interface. The input interface comprises a keyboard or similar, and is used by a user to input data used in computation processing in the product development process support system 10. The output interface comprises a monitor or similar, and displays or otherwise presents output enabling a user to reference the output of the product development process support system 10.

The input reception portion 12 is input reception means to receive input of information input from the input/output interface 11. Information received from the input reception portion 12 is information indicating dependencies between two requirements belonging to adjacent layers in product development processes, and information indicating the degree of influence of requirements on product development. A more specific explanation is given below. Information received by the input reception portion 12 is transmitted to the dependency derivation portion 13.

The dependency derivation portion 13 is dependency derivation means for deriving the dependency between two requirements belonging to the same layer. Derivation of a dependency is performed using information indicating the dependency between two requirements belonging to adjacent layers and information indicating the degree of influence of requirements on product development; this information is received by the input reception portion 12. Derivation of dependencies is performed based on dependency derivation rules, established in advance. These dependency derivation rules are stored in advance in the dependency derivation portion 13. Derivation of dependencies is described in more detail below. Information indicating derived dependencies is transmitted to the analysis portion 14.

The analysis portion 14 is analysis means for analyzing a dependency derived by the dependency derivation portion 13. This analysis includes decision of the priority order of requirements belonging to the same layer, and classification of the relevant requirements. Analyses by the analysis portion 14 are explained in more detail below. The results of analysis by the analysis portion 14 are transmitted to the input/output interface 11.

Figure 2:
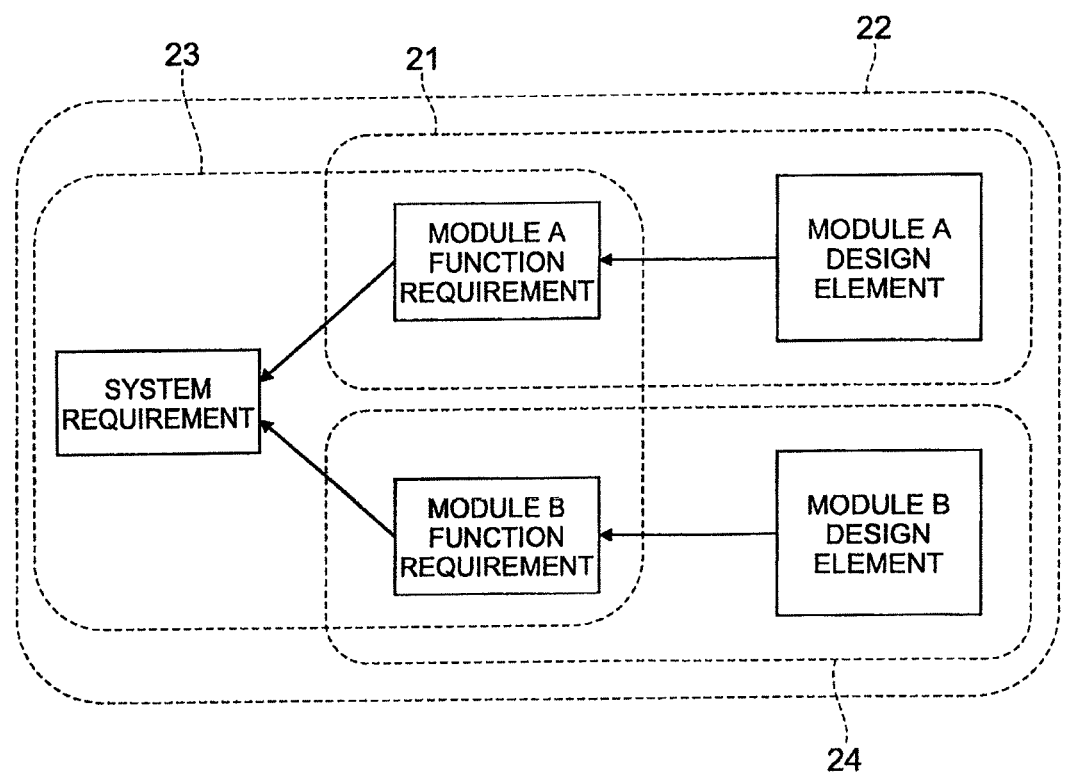
FIG. 2 is a drawing showing layers of requirements in the product development processes of an embodiment.
Figure 3:
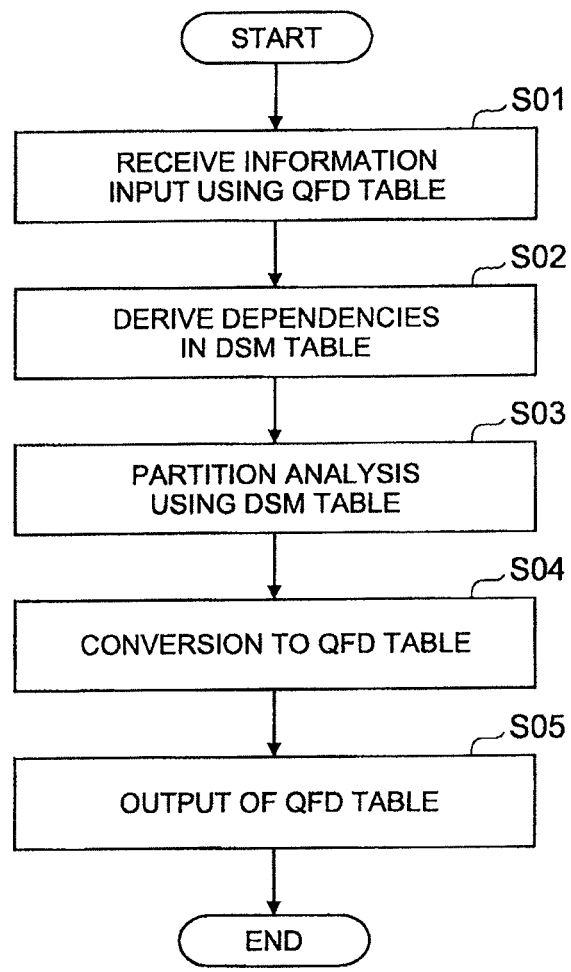
FIG. 3 is a flowchart showing the product development process support method of an embodiment of the invention.

Next, a product development process support method (processing executed in the product development process support system 10) of this embodiment is explained, using the flowchart of FIG. 3. First, analysis of the dependency of requirements in the module function requirement layer and module design element layer (a dependency for requirements in two layers) shown in the range 21 of FIG. 2 is explained. Then, analysis of dependencies of requirements for product development processes overall (dependencies for requirements in three layers) shown in the range 22 of FIG. 2 is explained.

Below, analysis of dependencies of requirements in the module function requirement layer and module design element layer shown in the range 21 of FIG. 2 is explained; using the flowchart of FIG. 3. First, in the product development process support system 10, information input by a user using the input/output interface 11 is received by the input reception portion 12 (S01, input reception step). Information input by the user is information indicating the dependency between module function requirements and module design elements, and information indicating the degree of influence of these requirements on product development. Input is performed according to a QFD table form such as shown in FIG. 4. Information relating to this form is stored in advance in the product development process support system 10, and is displayed by the input/output interface 11. In addition, input of information relating to requirement items (item names and similar) may be received, and form information generated from the input information.

As shown in FIG. 4, a QFD table form describes each of the items of module function requirements in the vertical direction (range 31, corresponding to row data). And, items for module design elements are described in the horizontal direction (range 32, corresponding to column data). Information indicating the dependency between each of the module function requirements and each of the module design elements can be input to the matrix 33 of the QFD table. Information indicating dependencies has already been input to the QFD table shown in FIG. 4; prior to input, all fields in a QFD table are empty.

Here, information indicating dependencies is information indicating the extent of influence of a module design element on the attainment of a module function requirement, and is specifically represented by a numerical value. As numerical values indicating the extent of dependencies, for example, the four values "9", "6", "3", "none" can be input, as shown in FIG. 4; the larger the numerical value, the stronger the dependency. Numerical values have the meanings indicated in the table of FIG. 5.

Information indicating individual degrees of influence on product development of the corresponding module function requirements can be input into the fields in the ranges 34 and 35 in the QFD table of FIG. 4. Specifically, as information indicating individual degrees of influence, there are function importance (corresponding to the fields of range 34) and risk of nonattainment (corresponding to the fields of range 35). Function importance and risk of nonattainment are input as numerical values in five stages from 1 to 5 (with 5 being strongest), as indicated in FIG. 4. Function importance indicates the impact imparted to merchandise planning (the attraction of merchandise) in the event that the module function requirement cannot be satisfied. Risk of nonattainment indicates the possibility that the module function requirement cannot be realized in the design concept (cannot be realized without adjustments). The degree of influence is determined as a priority from these two pieces of information indicating individual degrees of influence on product development. Priority is calculated using the following equation, and takes values from 0 to 1 (where 1 is strongest).

Priority=function importance·risk of nonattainment/25

This calculation is performed after input of function importance and risk of nonattainment in the input reception portion 12. In FIG. 4, priority corresponds to the values in the range 36. In subsequent computations, the numerical values of priority are used as the degree of influence of each system requirement on product development.

Information indicating individual degrees of influence of the respective corresponding module design elements on product development can be input into the fields in ranges 37 and 38 in the QFD table of FIG. 4. Specifically, information indicating individual degrees of influence may be element risk (corresponding to fields in range 37) and freedom of modification (corresponding to fields in range 38). Element risk and freedom of modification are input as numerical values in five stages from 1 to 5 (where 5 is the strongest), as shown in FIG. 4. Element risk evaluates the extent to which the module design element is newly designed relative to conventional designs. Freedom of modification indicates an evaluation of the extent of selection options as designs. For example, when a module design element is a common component and so cannot be changed, the freedom of modification is low. Further, when there are no other selection options for the module design element as a component, the freedom of modification is low. The degree of adjustment can be calculated as the degree of influence from these two pieces of information indicating the individual degrees of influence on product development. The degree of adjustment is calculated using the following equation, and takes numerical values from 0 to 1 (where 1 is strongest).

Degree of adjustment=element risk·freedom of modification/25

This calculation is performed after the element risk and freedom of modification are input in the input reception portion 12. In FIG. 4, the degree of adjustment corresponds to numerical values in the fields of range 39. In subsequent computations, numerical values for this degree of adjustment are also used as degrees of influence of each of the module function requirements on product development.

In the input reception step, information indicating the dependency between module function requirements and module design elements is received by the input reception portion 12 as numerical values input by a user into the matrix in the range 33 in FIG. 4. Further, information indicating the degree of influence of these requirements on product development is received by the input reception portion 12 as numerical values input by a user into the fields of ranges 34, 35, 37, 38 in FIG. 4. This received information is transmitted to the dependency derivation portion 13. Also, information indicating each of the above calculated degrees of influence is also transmitted to the dependency derivation portion 13.

Next, the dependency derivation portion 13 derives dependencies between two module function requirements and two module design elements from information indicating dependencies received by the information reception portion 12 and information indicating individual degrees of freedom received by the input reception portion 12 and calculated (S02, dependency derivation step). This relationship derivation is performed according to the DSM table. The dependency derivation portion 13 saves the computed data in the format of the DSM table. Specifically, this step is performed based on dependency derivation rules, described below.

Figure 6:
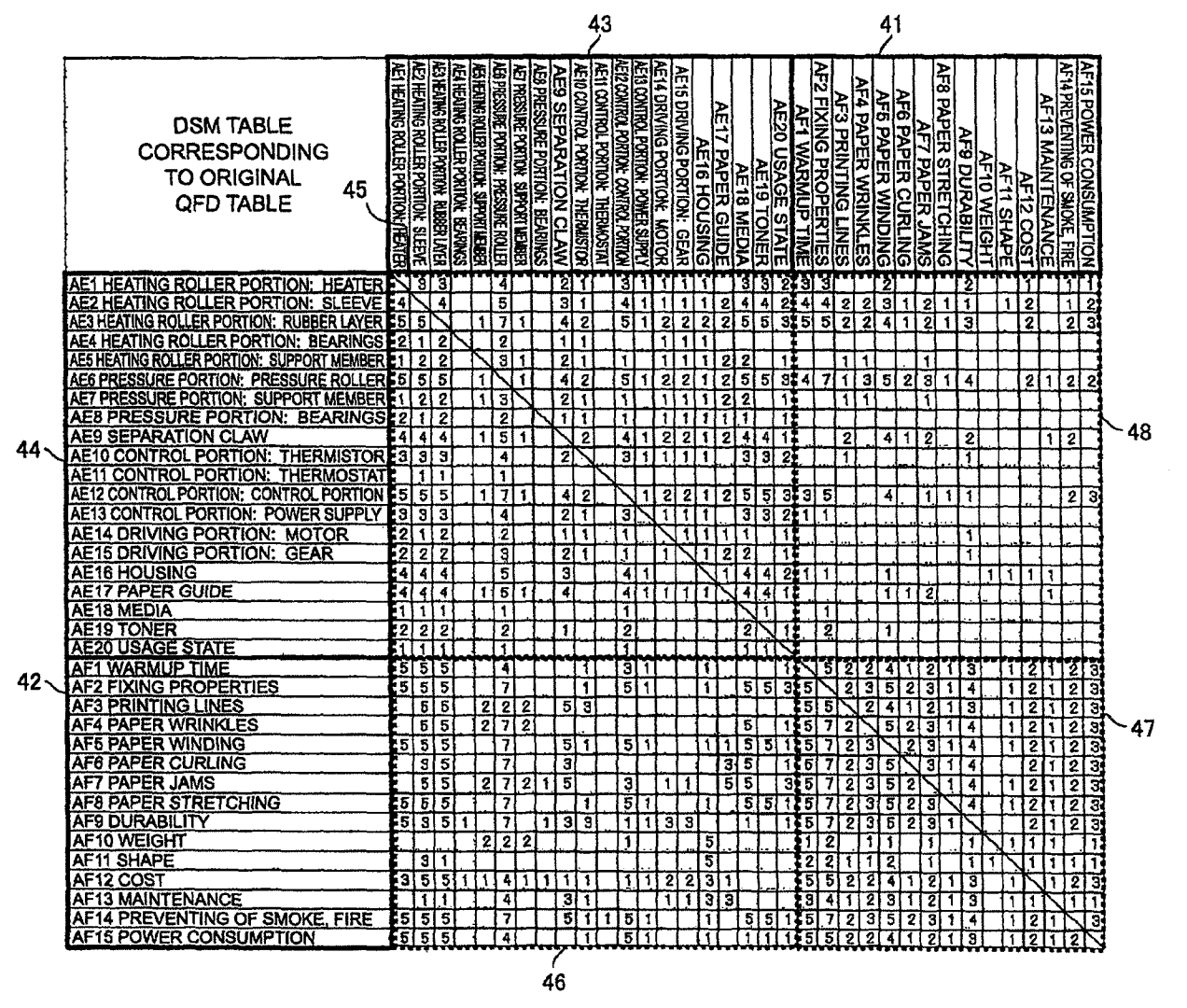

A DSM table is a table such as that shown in FIG. 6, which arranges the same elements in rows and columns and describes the bidirectional dependencies therebetween (in FIG. 6, numerical values are input for dependencies in the DSM table which have already been derived using this processing). Focusing on row data in the DSM table, the row data describes on which (and to what extent) other elements the element of that row depends. And, focusing on column data in the DSM table, the column data describes which other elements depend (and to what extent) on the element of that column. In the case of this embodiment, the items of all module function requirements and the items of all module design elements correspond to the elements of rows and columns in the DSM table. In FIG. 6, items in module function requirements are equivalent to the range 41 (column data) and range 42 (row data). Further, items in module design elements are equivalent to range 43 (column data) and range 44 (row data).

The matrices 45 to 48 store dependencies between items derived by the dependency derivation portion 13. As shown in FIG. 6, numerical values indicating the extent of the dependency of module design elements on module design elements (module design elements→module design elements) are stored in matrix 45. Numerical values indicating the extent of the dependency of module design elements on module function requirements (module design elements→module function requirements) are stored in matrix 46. Numerical values indicating the extent of the dependency of module function requirements on module function requirements (module function requirements→module function requirements) are stored in matrix 47. Numerical values indicating the extent of the dependency of module function requirements on module design elements (module function requirements→module design elements) are stored in matrix 48. Below, details of the dependencies stored in the matrices 45 to 48, and derivation methods, are explained.

Figure 7:
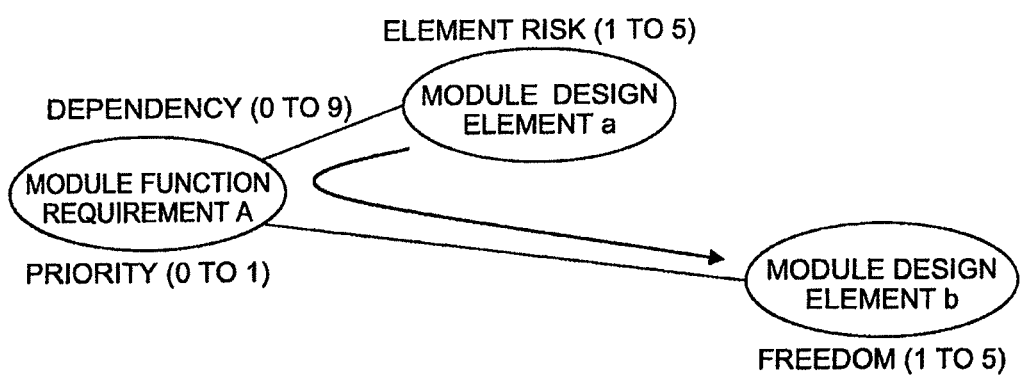
FIG. 7 is a drawing which schematically shows the dependency of module design elements on module design elements.

The dependencies of module design elements on module design elements, stored as numerical values in matrix 45, are relations influencing the same module function requirements, as shown in FIG. 7, and indicate the extent to which each module design element should be designed taking into account design conditions of other module design elements. The numerical value indicating the extent of dependency of module design element a on module design element b (a→b) is derived using information in the QFD table, received in S01. Specifically, within the QFD table, calculations are performed for module design element a and module design element b regarding dependencies via each of the module function requirements, using the following equation, and the maximum value is taken to be the numerical value indicating the extent of the dependency.

> Dependency formula: (When the numerical values of the dependencies of module design element $a$ and module design element $b$ on module function requirement $A$ are both 1 or greater)=(element risk of module design element $a$)/5·(dependency between module design element $a$ and module function requirement $A$)·(priority of module function requirement $A$)·(freedom of module design element $b$)/5

Here, decimals of the numerical values below the decimal point are discarded.

The above equation represents the following phenomena. (i) The stronger the influence on the degree of attainment of a module function requirement of a module design element (the higher the element risk, the stronger the QFD dependency), the more other module design elements are taken as premises (are dependency sources in dependencies). (ii) The higher the degree of freedom of a module design element, the more other module design elements affecting the same module function requirements can be taken into account. (iii) Dependencies occur via module function requirements with high priority.

Figure 8:
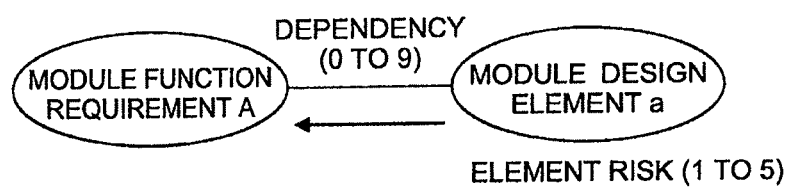
FIG. 8 is a drawing which schematically shows the dependency of module design elements on module function requirements.

As indicated in FIG. 8, the dependency of module design elements on module function requirements stored as numerical values in matrix 46 describe relationships in which the degree of attainment of module function requirements are affected by module design elements. The numerical value indicating the extent of the dependency of module design element a on module function requirement A (a→A) is derived using information in the QFD table received in S01. Specifically, the numerical value for the dependency between the module design element a and module function requirement A in the QFD table is converted into a numerical value for the dependency taking into account the element risk of the module design element a. Specifically, calculation is performed using the following equation.

> Dependency formula:=(dependency between module design element $a$ and module function requirement $A$)·(element risk of module design element $a$)/5

Here, decimals of the numerical values below the decimal point are discarded.

The above equation represents the following phenomenon. (i) Module design elements to be considered in the degree of attainment of module function requirements are module design elements receiving strong influences, and, the higher the element risk, the more a module design element should be considered.

Figure 9:
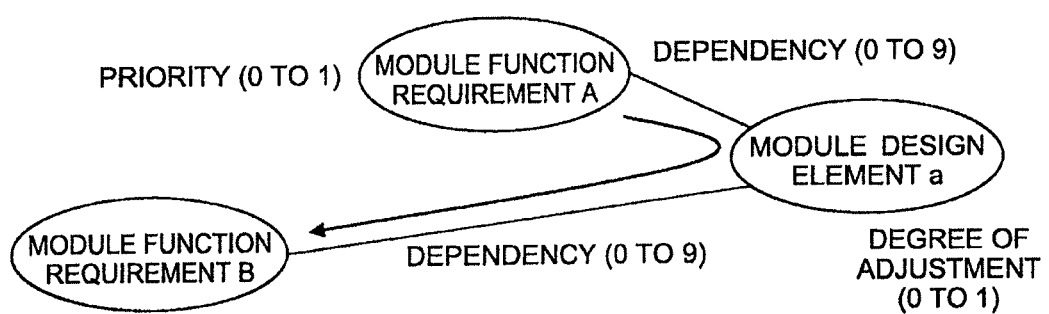
FIG. 9 is a drawing which schematically shows the dependency of module function requirements on module function requirements.

As indicated in FIG. 9, the dependency of module function requirements on module function requirements stored as numerical values in matrix 47 describe relationships in which influence is received from the same module design elements. Mutual attainment of module function requirements in such a dependency must be confirmed while conducting product development, and the extent of the dependency indicates the degree to which the state of attainment of other module function requirements must be considered when confirming module function requirements. A numerical value indicating the extent of the dependency of module function requirement A on module function requirement B (A→B) is derived using information in the QFD table received in S01. Specifically, the following equation is used to calculate the dependency, via each module design requirement, of the module function requirement A on the module function requirement B in the QFD table, and the maximum value is taken to be the numerical value indicating the extent of the dependency.

> Dependency formula:=(priority of module function requirement)·(dependency between module design element $a$ and module function requirement $A$)·(degree of adjustment of module design element $a$)·(dependency between module design element $a$ and module function requirement $B$)/9

Here, decimals of the numerical values below the decimal point are discarded.

The above equation represents the following phenomena. (i) The higher the priority of a module design element (the higher the function importance, the higher the risk of nonattainment), the more frequently modification of module design elements influenced by nonattainment occurs. (ii) When a module function requirement is not attained and a module design element is modified, among module design elements which are strongly dependent, modification of module design elements with a high degree of adjustment occurs more frequently. (iii) The stronger the influence on other module function requirements of a module design element which has been modified, the stronger the influence due to the modification, so that consideration is necessary.

Figure 10:
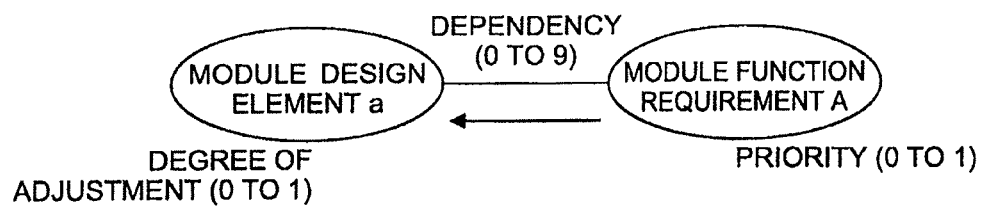
FIG. 10 is a drawing which schematically shows the dependency of module function requirements on module design elements.

As indicated in FIG. 10, the dependency of module function requirements on module design elements stored as numerical values in matrix 48 describe relationships in which the state of attainment of module function requirements influences modification and similar of module design elements, and indicates the extent of alteration of design conditions of module design elements influenced by the results of confirmation of module function requirements. Design conditions for module design elements must be modified depending on the state of attainment of influencing module function requirements. A numerical value indicating the extent of the dependency of a module function requirement A on a module design element a (A→a) is derived using information in the QFD table received in S01. Specifically, based on numerical values for the dependency between the module design element a and module function requirement A in the QFD table, a numerical value is calculated for the extent to which module function requirement A is not satisfied and readjustment of module design element a is necessary. Specifically, calculation is performed using the following equation > Dependency formula:=(priority of module function requirement $A$)·(dependency between module design element $a$ and module function requirement $A$)·(degree of adjustment of module design element $a$)

Here, decimals of the numerical values below the decimal point are discarded.

The above equation represents the following phenomena. (i) The higher the priority of a module function requirement (the higher the function importance, the higher the risk of nonattainment), the more frequently modifications do module design elements influenced by nonattainment of the module function requirement occur. (ii) When, due to nonattainment of a module function requirement modification of a module design element occurs, modifications of module design elements with a strong dependency and with a high degree of adjustment occur more often.

When numerical values for each of the dependencies are derived in the dependency derivation portion 13 as described above, the matrices (with numerical values entered) 45 to 48 shown in FIG. 6 are obtained. The numerical values obtained for dependencies are output to the analysis portion 14. The above derivation of numerical values is a representative example, and priorities and degrees of adjustment may be modified according to the case in a given implementation.

Next, the analysis portion 14 decides the priority order to be considered for module function requirements and module design elements in product development processes from the dependencies derived by the dependency derivation portion 13 according to the DSM table, and partitions the module function requirements and module design elements (S03, analysis step). This processing is performed according to analysis rules established in advance, as explained below. Analysis rules are stored in advance in the analysis portion 14.

The decision of priority order for each of the elements of a requirement (rearrangement of the order of elements), and partitioning, may be performed based on a well-known analysis method (partition analysis) in the DSM method. When the concept of a DSM table order is introduced, earlier items (items closer to the dependency source) in the order are positioned higher in the case of rows, and further leftward in the case of columns.

Figure 12:
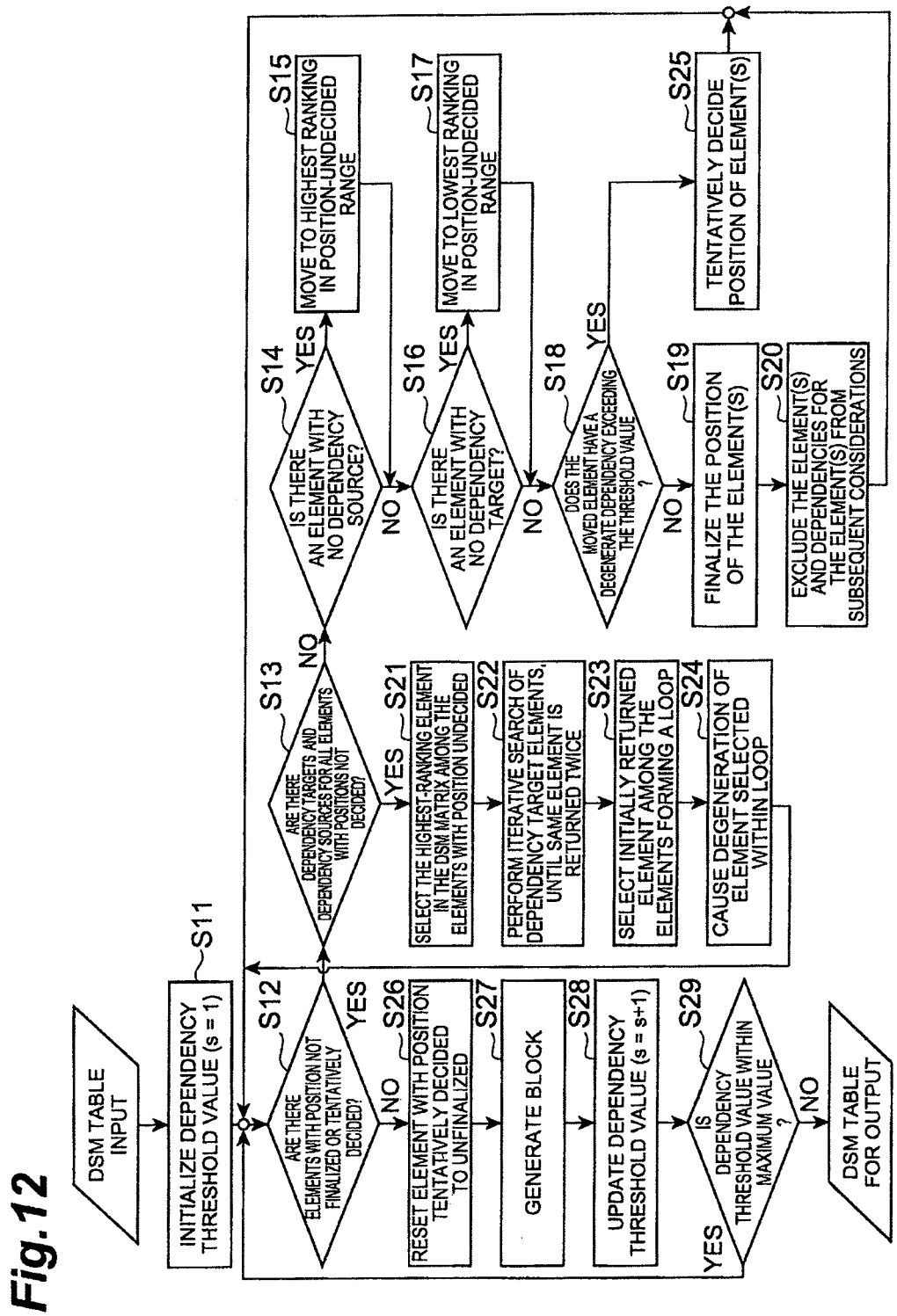
FIG. 12 is a flowchart showing partition analysis processing.

Priority order decision (rearranging the element order) and partitioning are performed as follows. The order of rows and columns in the DSM table is changed, but the elements comprised by the DSM table and the dependencies between elements do not change. In DSM table partition analysis, DSM table row and column orders are rearranged so as to compress loops in dependencies between elements to be as small as possible (into what are called loop chains or blocks). This rearrangement results in organization of the dependencies between elements for analysis, so that an order is derived which clarifies which other elements are taken as premises by an element, and so that loops (task repetitions) are reduced to a minimum. Below, an example of partition analysis is explained. This analysis method is a well-known method described, for example, in "Systems Analysis and Management (STRUCTURE, STRATEGY AND DESIGN)", by Donald V. Steward. In order to facilitate understanding of the explanation, the sample DSM table shown in FIG. 11 is used. As shown in FIG. 11, the sample DSM table has ten elements. Hereafter, the flowchart of FIG. 12 is used to explain partition analysis.

First, the analysis portion 14 initializes the threshold value of dependencies (s=1) used in the following partition analysis (S11). The threshold value s is stored as data in analysis portion 14. Next, analysis portion 14 judges whether there are elements the position of which has not been finalized or provisionally decided (S12). Here, there are no elements which have been finalized or provisionally decided, and so such elements are judged to exist.

When such a judgment is made, the analysis portion 14 judges whether there are dependency sources and dependency targets for all elements the position of which has not been decided (S13). Here, dependencies related to judgments are not limited to those having numerical values equal to or above the threshold value. Here "element 1" and "element 9" do not have both a dependency source and a dependency target, and so it is judged that all elements do not have dependency sources and dependency targets. When such a judgment is made, the analysis portion 14 judges whether there are elements without dependency sources (S14). Here, "element 1" does not have a dependency source, and so it is judged that there is an element without a dependency source. The absence of a dependency source means that in the DSM table there is no dependency in the row direction.

When such a judgment is made, the analysis portion 14 moves the element with no dependency source (here, "element 1") to the highest ranking (S15). Then, the analysis portion 14 judges whether there are elements without a dependency target (S16). Here, "element 9" has no dependency target, and so it is judged that there is an element without a dependency target. The absence of a dependency target means that in the DSM table there is no dependency in the column direction. When such a judgment is made, the analysis portion 14 moves the element with no dependency target (here, "element 9") to the lowest ranking (S17).

Figure 13:
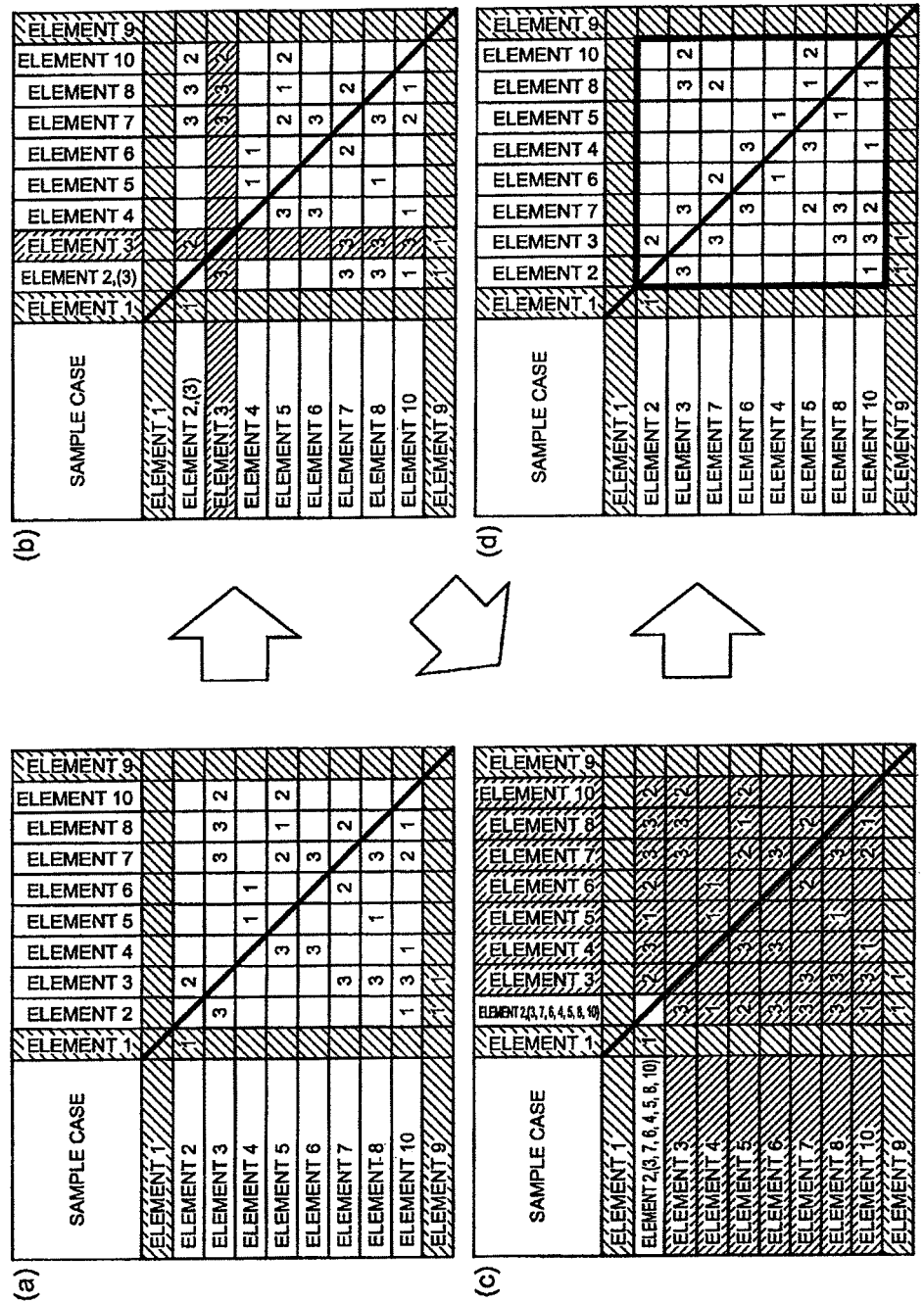
FIG. 13 is a drawing showing trends in DSM tables in partition analysis.

Next, the analysis portion 14 judges whether elements moved in S15 or S17 have a degenerate dependency exceeding a threshold value (S18). The moved elements "element 1" and "element 9" do not have a degenerate dependency, and so are judged not to be degenerate. When such a judgment is made, the analysis portion 14 finalizes the position of the moved element (here, "element 1" and "element 9") (S19). Elements the positions of which have been finalized, and dependencies relating to these elements, are excluded from subsequent considerations (S20). (a) in FIG. 13 shows the state of processing from the initial state shown in FIG. 11 up to this point. Elements the positions of which have been finalized or tentatively decided at this stage are "elements 2, 3, 4, 5, 6, 7, 8, 10". All of these elements have a dependency source and a dependency target.

Next, the analysis portion 14 again performs the judgments S12 and S13. Here, in the judgment of S13, there are dependency sources and dependency targets for all elements the positions of which have not been finalized or tentatively decided, and so such a judgment is made. Next, the analysis portion 14 selects the highest-ranking element among the elements positions of which have not been decided (S21). Here, "element 2" is selected. Next, the analysis portion 14 performs an iterative search of dependency target elements from the selected element until the same element is returned twice (S22). At this time, the dependencies used in the search are those for which the numerical value of the dependency is equal to or greater than the threshold value (here, 1 or greater). Here, the analysis portion 14 can recognize the loop "element 2"→"element 3"→"element 2" which returns to "element 2". Next, the analysis portion 14 selects the first element searched among the elements forming the loop (S23). Here, "element 2" is selected.

Next, the analysis portion 14 causes degeneration of the element selected in S23 contained within the loop (S24). Here, "causing degeneration" specifically means performing the following processing. First, the degeneracy source (the element contained in the loop) is temporarily excluded from consideration. Then, the matrix data to be made degenerate is temporarily copied to the degeneracy target (the element selected in S23). Here, when numerical values are entered into the copy target, copying is not performed. (b) in FIG. 13 shows the state in which processing up to this stage has been performed. In this stage, elements the positions of which have not been finalized or tentatively decided are "elements 2 (3), 4, 5, 6, 7, 8, 10". All of these elements are in a state of having a dependency source and dependency target.

Next, returning to the second performance of judgment S12, processing similar to that above (S12, S13, S20 to S24) is performed, and "element 7", "element 6", "element 4", "element 5", "element 8", and "element 10" are generated, in order, to "element 2". (c) in FIG. 13 shows the state in which this processing has been performed. Here, "element 2" is the only element to be considered. Within the range of elements to be considered, "element 2" has no dependency source. Hence after passing through the judgments of S12, S13, S14, "element 2" is moved to the highest ranking within the range for which a position has not been decided; but the element is already in the highest-ranking position, so no movement is performed. Next, the analysis portion 14 judges whether the moved element (strictly, the element which would be moved, here "element 2") has a degraded threshold value (S18). As described above, each of the elements has been degraded, and so "element 2" is judged to be degraded. When such a judgment is made, the analysis portion 14 tentatively finalizes the position of the element ("element 2") (S25). In this state, positions are finalized or tentatively decided for all elements with threshold value s=1.

Next, the analysis portion 14 returns to the judgment of S12, and judges that there are no elements the positions of which have not been finalized or tentatively decided. Upon making this judgment, the analysis portion 14 resets elements the positions of which have been tentatively finalized (S26). Next, the analysis portion 14 generates a loop chain to partition elements with threshold value finalized at s=1, and elements not finalized (S27). Specifically, as shown schematically in (d) of FIG. 13, a loop chain is generated to frame the dependency matrix, as shown. Next, the analysis portion 14 adds 1 to the dependence threshold value (s=s+1), and the threshold value is updated (S28). Next, the analysis portion 14 judges whether the dependency threshold value is within the maximum value of the dependence numerical values contained in the DSM table (S29). If judged to be within the maximum value, the analysis portion 14 uses the threshold value updated in S28 to again perform the processing of the above-described S12 to S29. Here, the updated threshold value s is 2, and is within the maximum value of 3 for the dependency numerical values contained in the DSM table, so that processing is again performed.

When on the other hand the threshold value is judged not to be equal to or less than the maximum value, the analysis portion 14 ends processing, and outputs the DSM table resulting from processing up to that point. FIG. 14 shows the output DSM table. The three frames in FIG. 14 are, in order from the outside, the frame for a threshold value of 1, the frame for a threshold value of 2, and the frame for a threshold value of 3. By means of the above processing, the priority position of each element is decided, and partitioning is performed.

Figure 15:
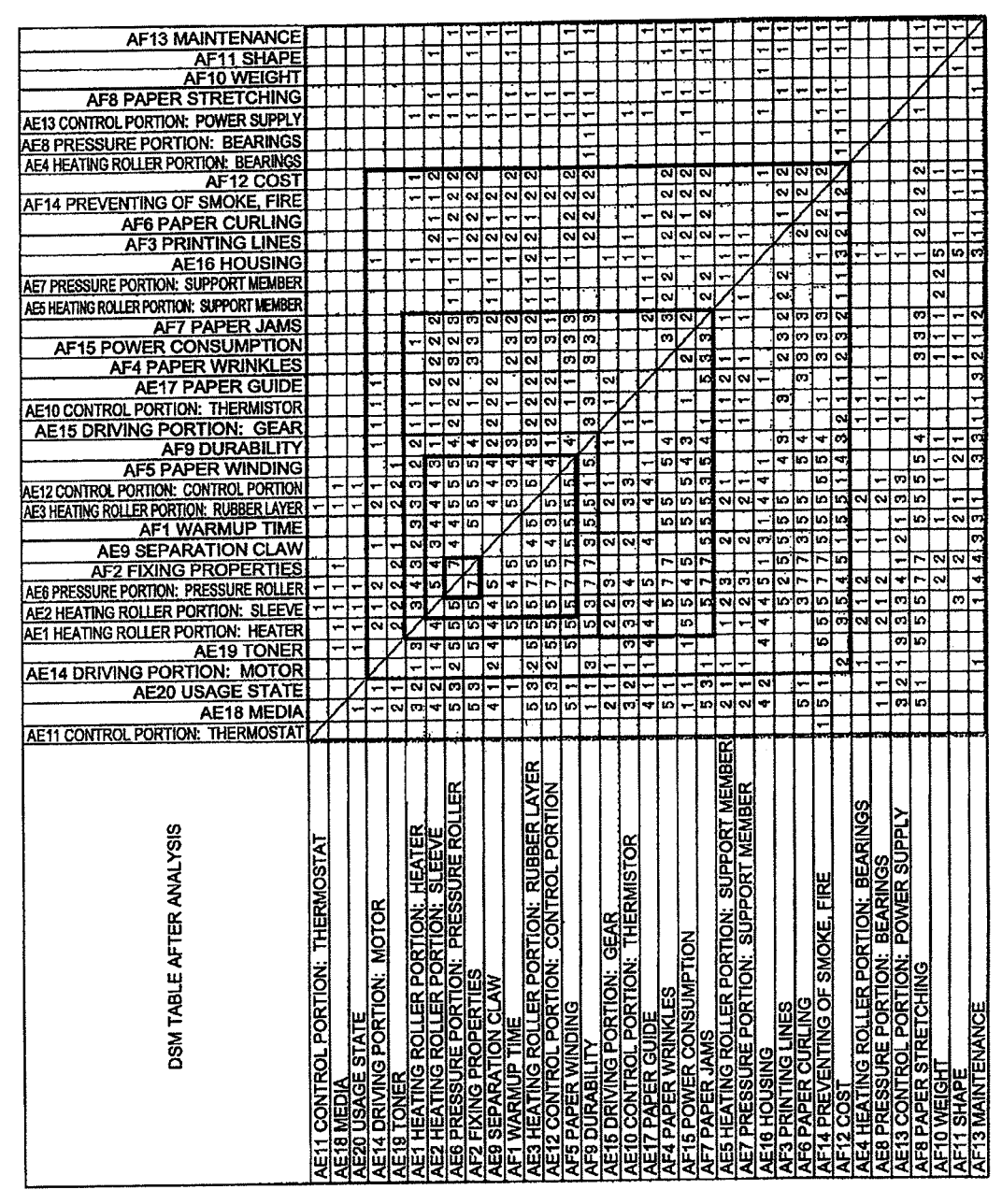

The above partition analysis of the DSM table in FIG. 6 is performed, and the priority order to be considered of module function requirements and module design elements in product development processes are decided, and partitioning of the module function requirements and module design elements is performed, resulting in the DSM table shown in FIG. 15. In the DSM table of FIG. 15, partitioning results in generation of six loop chains.

Returning to the flowchart of FIG. 2, next the analysis portion 14 in the product development process support system 10 uses the DSM table with partition analysis performed to perform conversion into a QFD table (S04). This conversion is performed in order that a user can easily judge the analysis results. This is because, for a user, a QFD table, with requirements arranged by layer, is easier to view than a DSM table, in which all requirements are arranged together. Conversion of a DSM table into a QFD table is performed by rearranging the original QFD table (that shown in FIG. 4) according to the positions of module function requirements and module design elements rearranged in the DSM table in the processing of S03. Also, the information of the loop chains obtained in the processing of S03 is transferred to the QFD table. A QFD table obtained by conversion is shown in FIG. 16. The information of this table is output to the input/output interface 11.

Next, in the input/output interface, the QFD table converted in S04 is output (S05). The table shown in FIG. 16 is also an output image. The user references the output and utilizes the information as appropriate in product development processes.

The converted QFD table after analysis reflects the priority positions of each of the module function requirements and module design elements obtained by the DSM table after analysis, as well as loop chain information identified using the DSM table. The meaning of this table is as follows. The basic order used to establish design conditions of each of the module design elements is the order from left to right in the table. For each module design element, what is positioned to the left of the module design element must be established prior to that module design element (the module design element on the left side is the premise for other module design elements to the right; that is, module design elements on the right side are dependent on module design elements on the left). Further, for each module function requirement, attainment of what is positioned above the module function requirement must be confirmed prior to attainment of the module function requirement (the module function requirement above is the premise for other module function requirements below; that is, module function requirements below are dependent on module function requirements above).

Further, the further on the inside the loop chain of module function requirements and module design elements, the stronger is the loop, and the more efficiently trial-and-error must be conducted within the loop. For example, simulations and other efficient means of function verification must be used for inner loops. For example, the tasks of verifying the plurality of module design elements and the plurality of module function requirements identified by a loop should be conducted simultaneously (concurrently), while taking measures to ensure coordination. More specifically, the information can also be used as guidelines to discard development phases according to loop chain information, and to confirm design conditions and functions to be finalized in each phase.

As explained above, by means of this embodiment, information containing dependencies between two arbitrary elements belonging to the same layer, making up a DSM table, can be derived from easily input information in the form of a QFD table. Hence these dependencies can be referenced to make decisions relating to requirements to be considered in product development processes so as to avoid wasteful repetitive tasks. By this means, wasteful repetitive tasks can easily be eliminated in processes to develop complex products. In this embodiment, information indicating directional dependencies is derived using a DSM table, and, information indicating directional dependencies is also derived for dependencies between elements in adjacent layers, rather than between elements in the same layer, so that more detailed analysis is possible.

In this embodiment, when an attempt is made to input information indicating dependencies in a DSM table, approximately four times the number of numerical values must be input compared with information indicating dependencies in a QFD table. Normally, mismatches between information occur more frequently when large amounts of information are input; and in this respect as well, this embodiment is superior compared with analysis methods of the prior art.

Further, by performing partition analysis of a DSM table derived from a QFD table as in this embodiment, decisions related to requirements in product development processes with a desirable ordering and classification can be made, from the standpoint of preventing wasteful repetitive tasks.

Further, by performing processing according to QFD tables and DSM tables, the analysis methods of the QFD method and the DSM method can be applied together with the method of this embodiment, and software of the prior art for these analysis methods can also be utilized, to implement this embodiment more reliably and easily.

The embodiment described above analyzes dependencies in the portion indicated by range 21 in FIG. 2, that is, dependences of requirements in two layers. Next, analysis of the dependences between requirements in all product development processes, indicated in range 22 in FIG. 2, that is, of dependences of requirements in three layers, is explained. In the case of three layers also, the details of processing are essentially the same as for two layers, described above, but processing is added to accommodate the addition of a layer.

Figure 17:
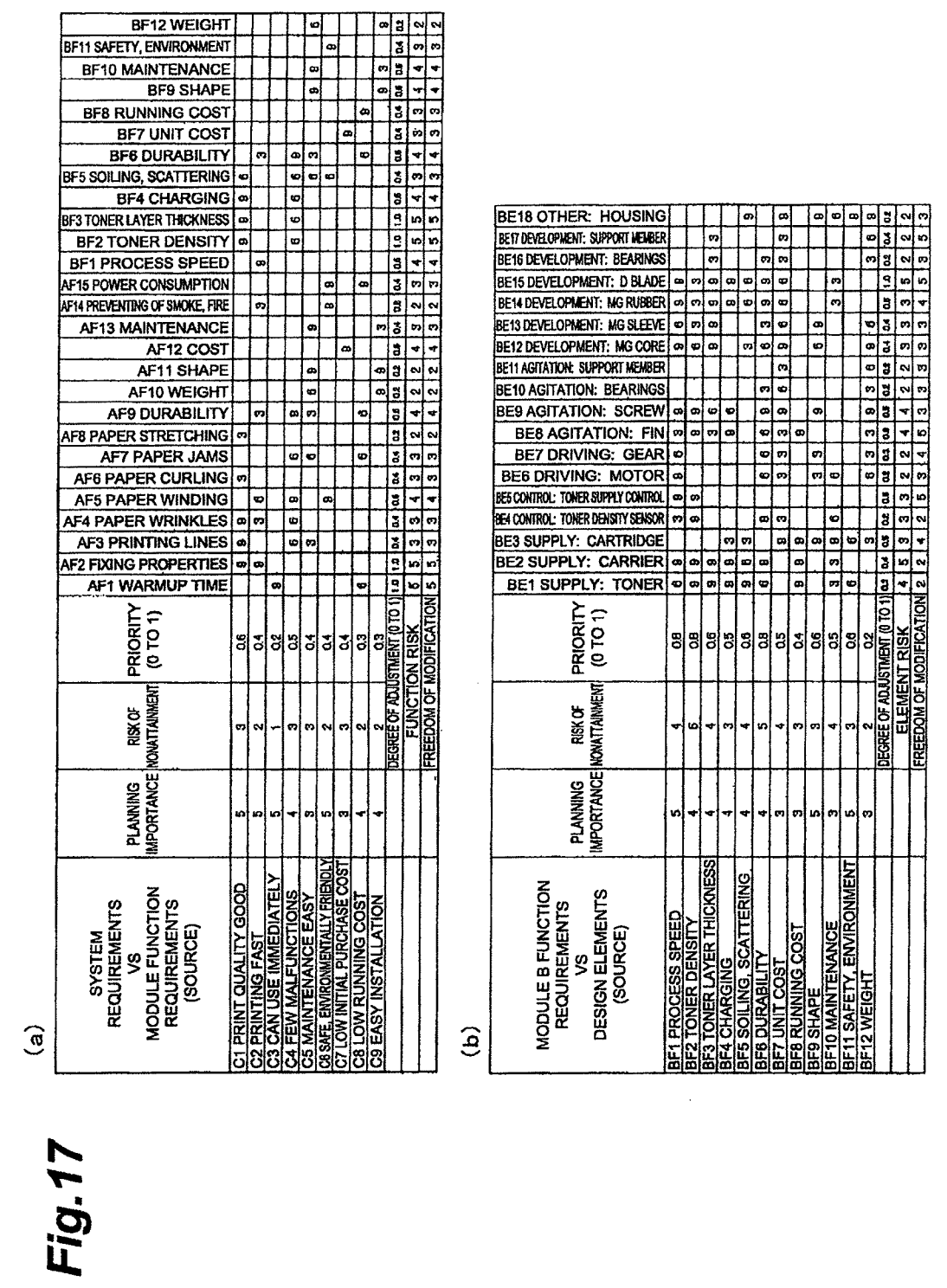

First, in the flowchart S01 of FIG. 3, information input to the QFD table is received by the input reception portion 12 for each adjacent layer. That is, in this embodiment, separate input to the QFD table of information indicating the dependencies between system requirements and module function requirements (rate 23 in FIG. 2), information indicating the dependences between module A function requirements and module A design elements (range 21 in FIG. 2, similar to the above-described two layers), and information indicating the dependencies between module B function requirements and module B design elements (range 24 in FIG. 2) is received. (a) in FIG. 17 shows the QFD table (called "QFD1") corresponding to information indicating the dependencies between system requirements and module function requirements (range 23 in FIG. 2). (b) in FIG. 17 shows the QFD table (called "QFD3") corresponding to information indicating the dependencies between module B function requirements and module B design elements (range 24 in FIG. 2). The QFD table (called "QFD2") corresponding to information indicating the dependencies between module A function requirements and module A design elements (range 21 in FIG. 2) is similar to that described above (the table shown in FIG. 4).

Figure 18:
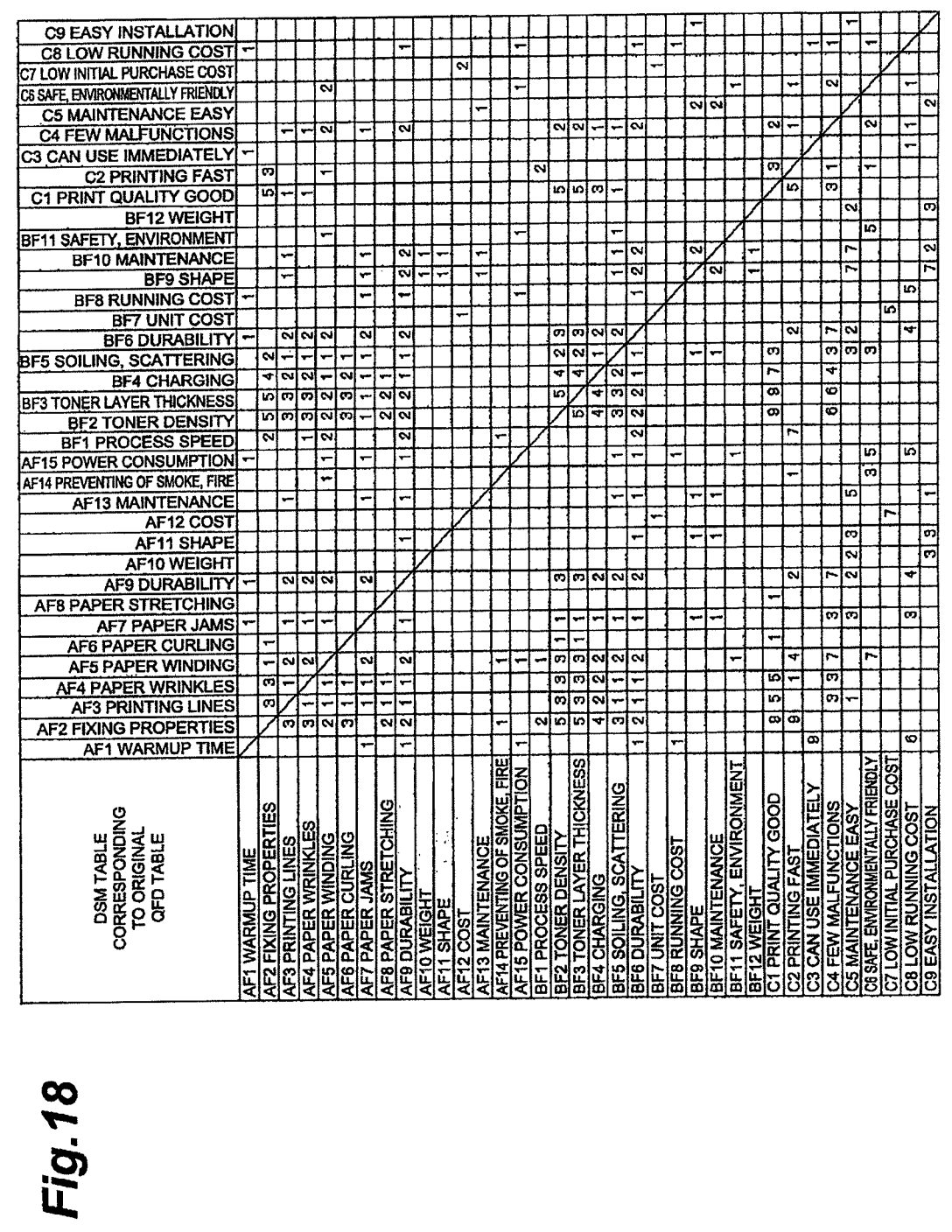
Figure 19:
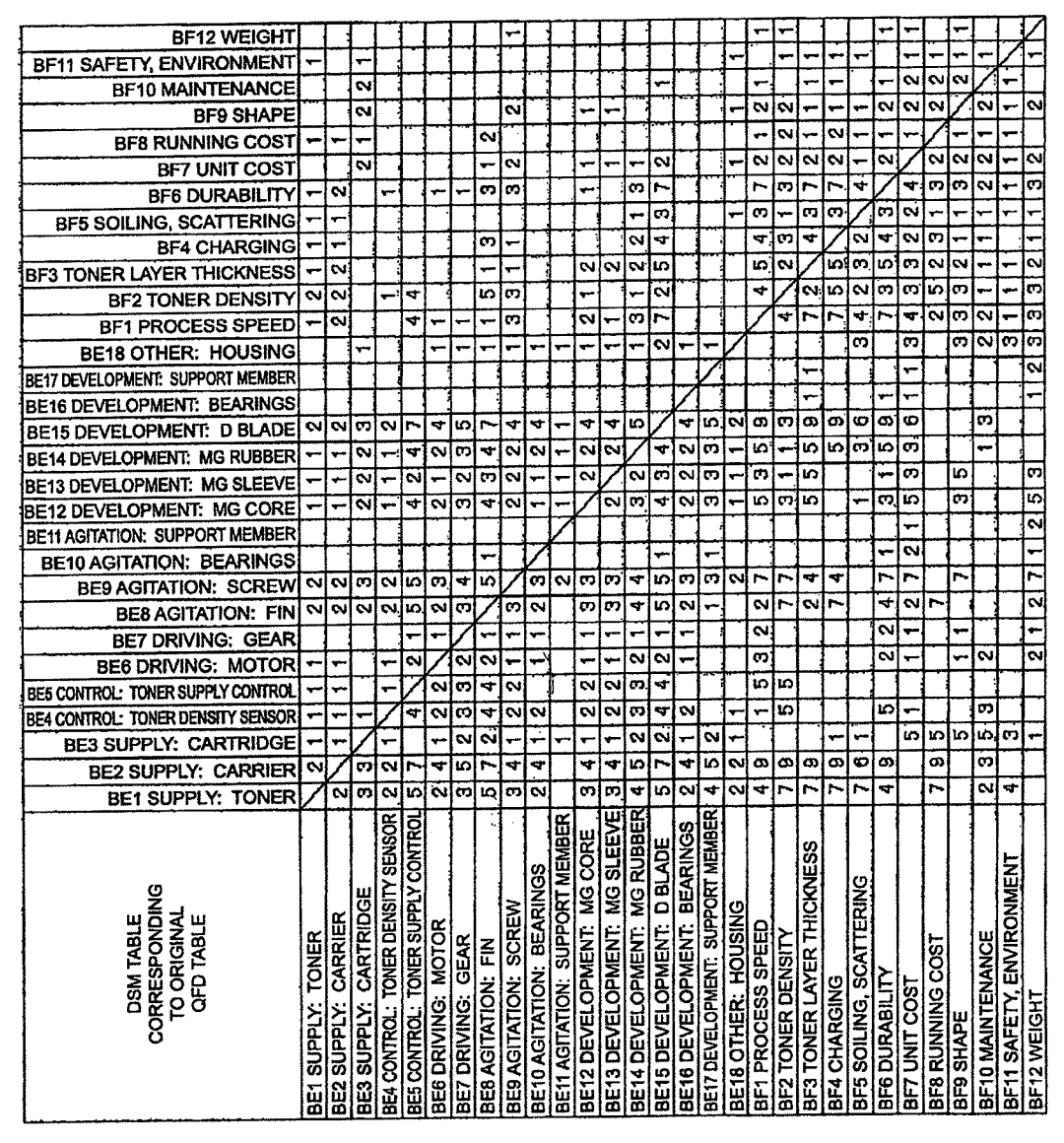

Next, derivation of dependencies in DSM tables by the dependency derivation portion 13 in S02 in the flowchart of FIG. 3 is performed by generating respective DSM tables from each QFD table. The derivation method is similar to that in the above-described embodiment. Due to differences in layers, there are portions in which the names of degrees of influence differ, but the processing is similar. The DSM table corresponding to "QFD1" (called "DSM1") appears in FIG. 18. The DSM table corresponding to "QFD3" (called "DSM3") appears in FIG. 19. The DSM table corresponding to "QFD2" (called "DSM2") is similar to that described above (shown in FIG. 6).

Figure 20:
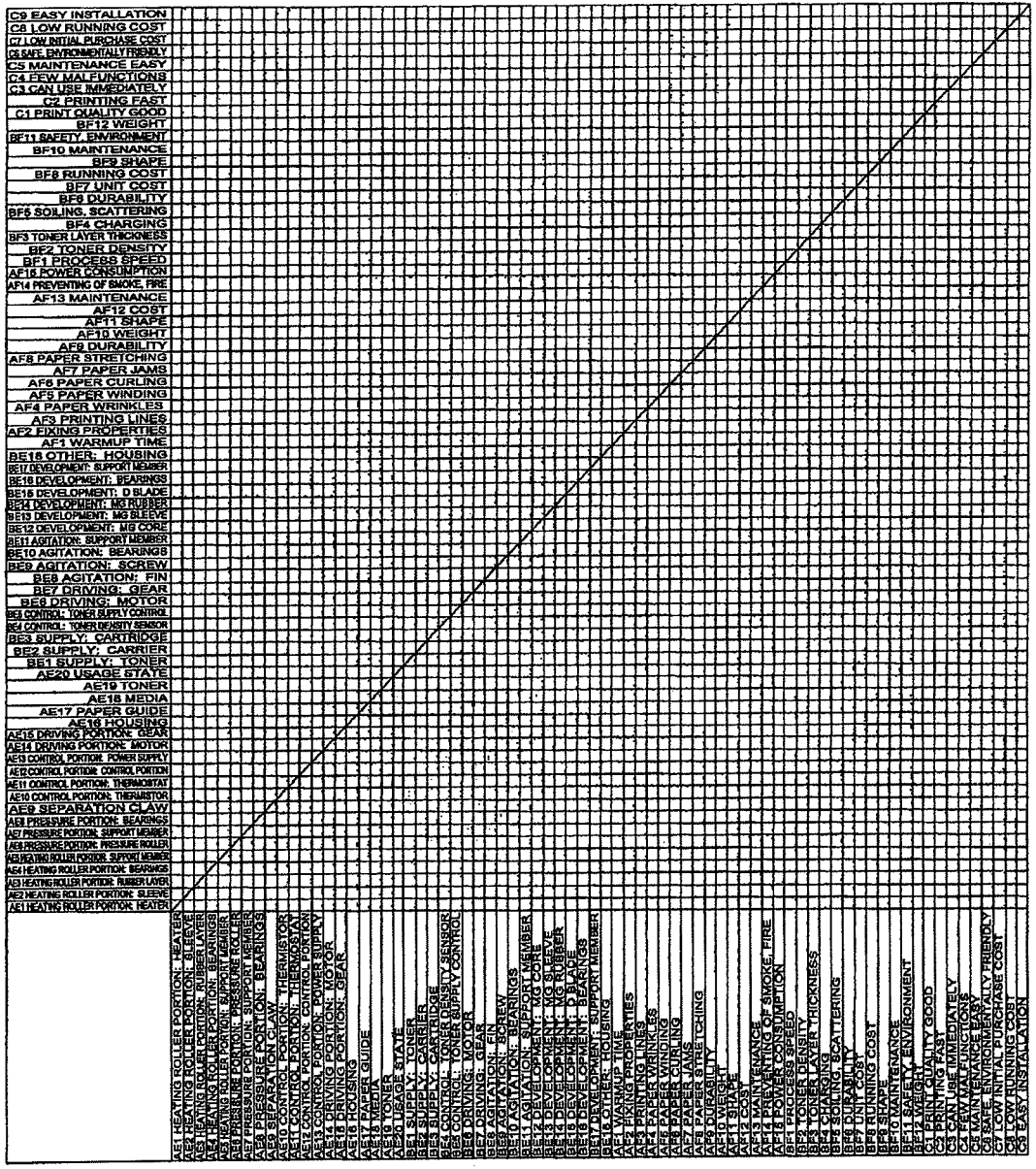
FIG. 20 is a drawing showing the framework of an integrated DSM table when layers are in three stages.
Figure 21:
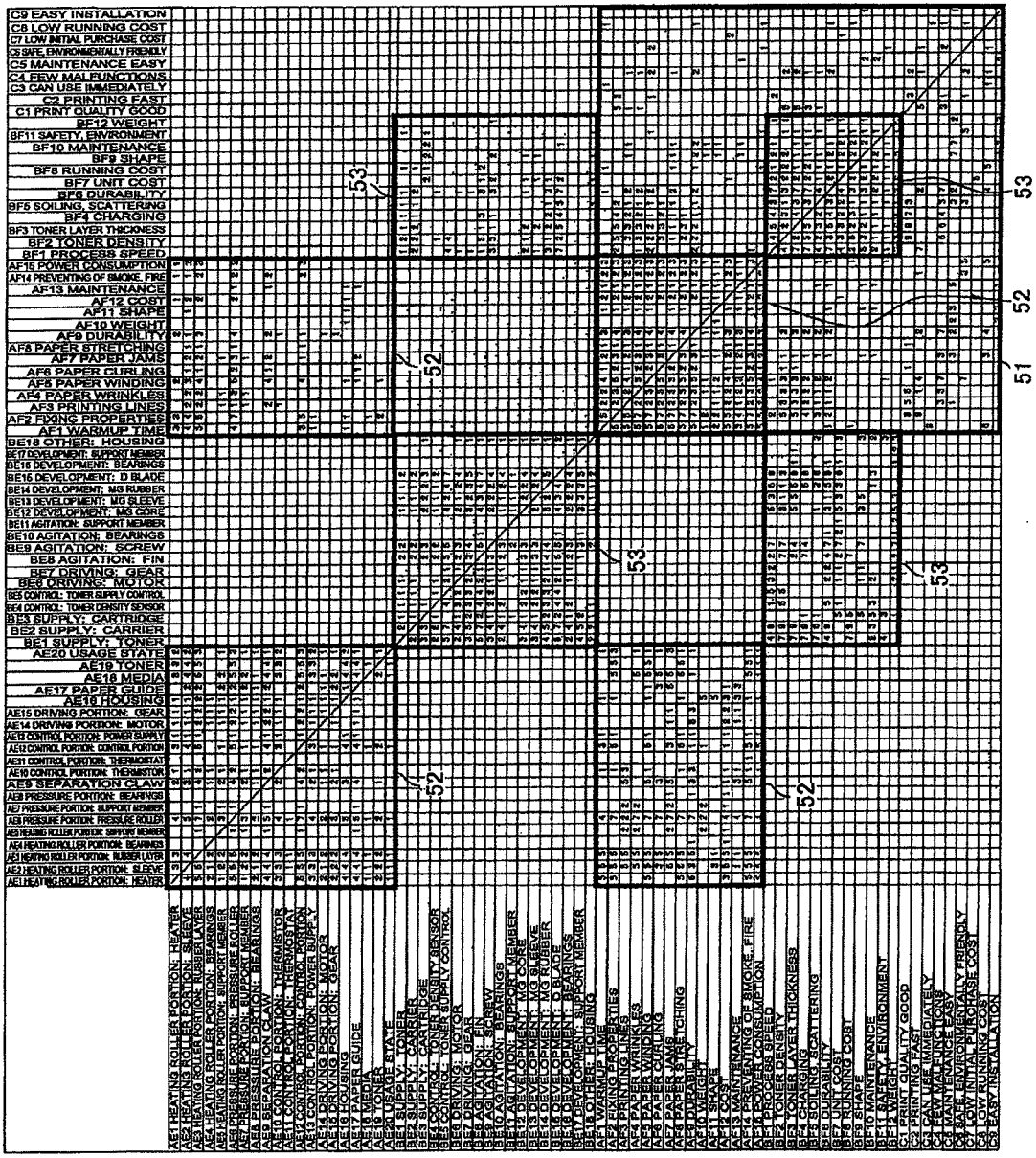
FIG. 21 is a drawing showing a DSM table before partition analysis when layers are in three stages.

Next, prior to the partition analysis of S03 in the flowchart of FIG. 3, the dependency derivation portion 13 generates a DSM table (called "DSM4") which integrates "DSM1" to "DSM3"). First, as shown in FIG. 20, the framework for "DSM4" is generated, taking all items of the system requirements, module function requirements, and module design elements as elements of the matrix. The numerical values of "DSM1", "DSM2", and "DSM3" are then input in order into the framework of the generated "DSM4". Overlapping ranges are overwritten by inputting values afterwards. FIG. 21 shows "DSM4" with numerical values input. In "DSM4" in FIG. 21, the numerical values of range 51 correspond to the numerical values of "DSM1". In "DSM4", the numerical values of range 52 correspond to the numerical values of "DSM2". And the numerical values of range 53 correspond to the numerical values of "DSM3".

Figure 22:
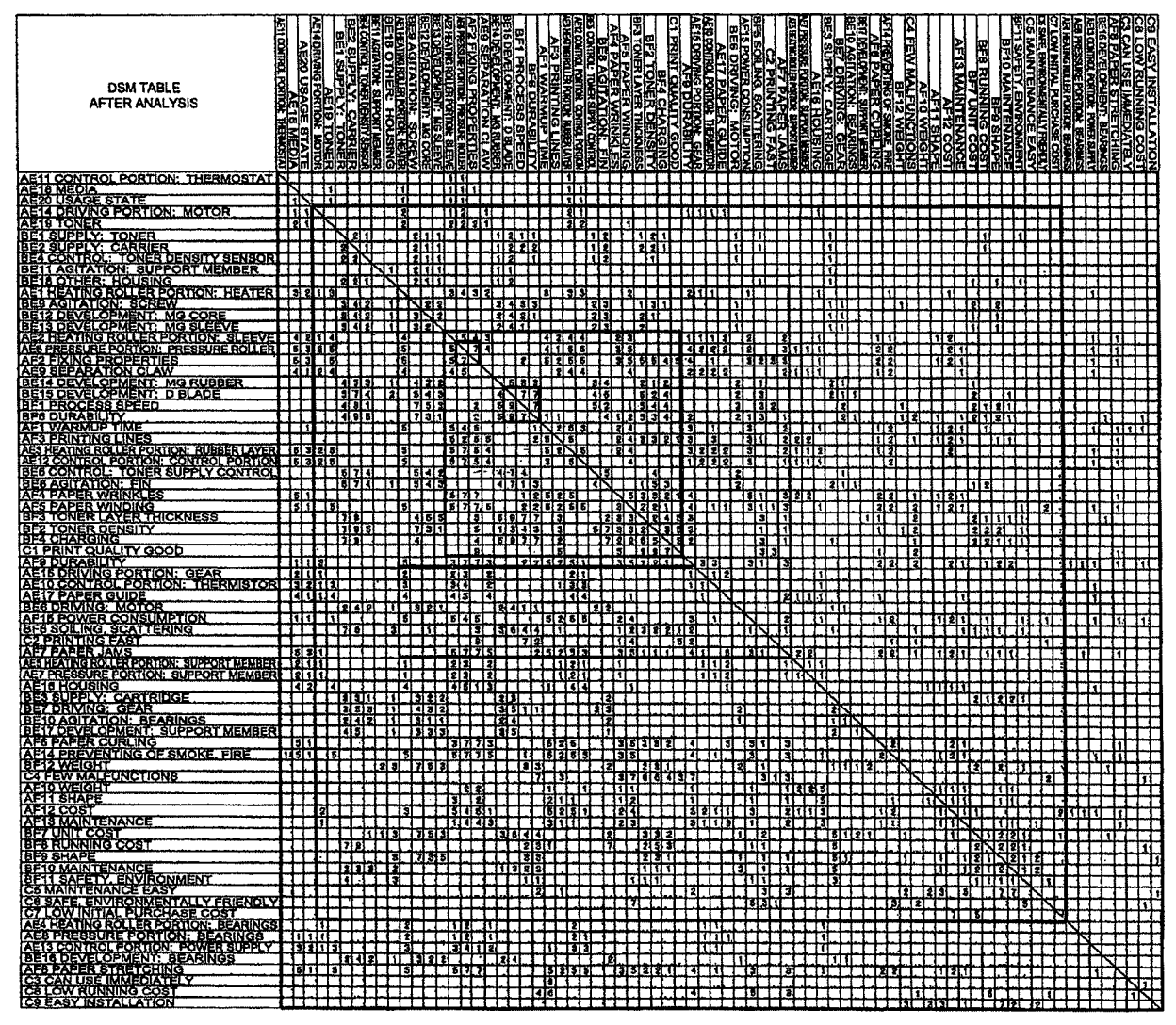

Next, partition analysis by the analysis portion 14 using a DSM table in S03 of the flowchart of FIG. 3 is performed using "DSM4" table obtained by integrating "DSM1" to "DSM3" shown in FIG. 21. The partition analysis itself is performed similarly to the method of the above-described embodiment. FIG. 22 shows "DSM4" after partition analysis.

Figure 23:
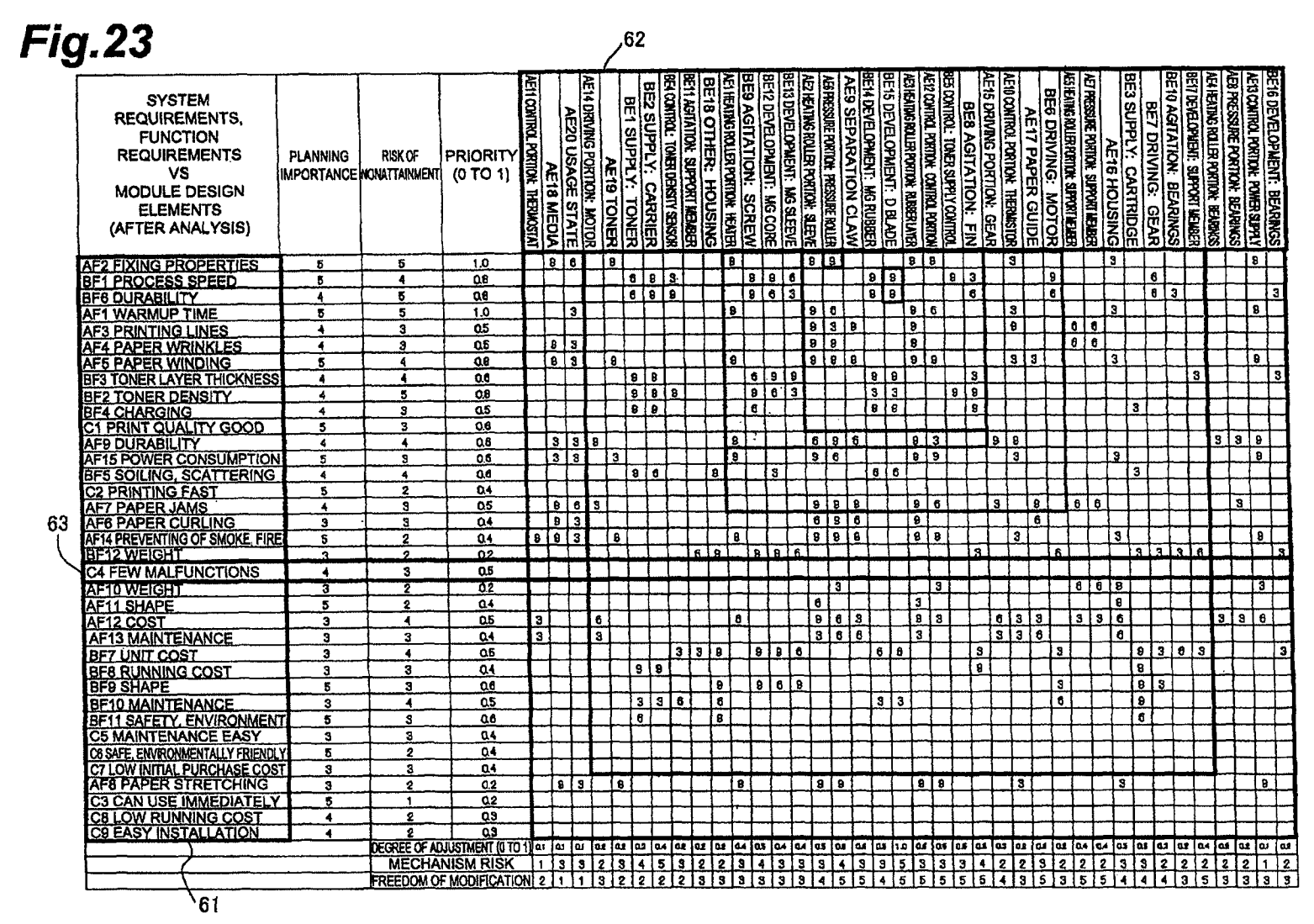

Next, the analysis portion 14 converts the "DSM4" table after partition analysis into a QFD table. FIG. 23 shows the converted QFD table. Here the QFD table presents items for the system requirements and module function requirements in the vertical direction (corresponding to the data for each row in range 61). Also, items for module design elements are presented in the horizontal direction (corresponding to the data for each column in range 62). Numerical values corresponding to "QFD1" to "QFD3" are input into the matrix of the QFD table. However, dependencies between system requirements and module design elements, which are two layers apart, are not input, and so these portions (for example, row 63 in FIG. 23) are empty. By thus performing the above-described processing for conversion into a QFD table from "DSM4" into this QFD table format, the QFD table after conversion shown in FIG. 23 is obtained.

In this way, this invention can also be applied to product development processes having factors in three or more layers, and the above-described advantageous results can be obtained.

The invention claimed is:

1. A product development process support system comprising a processor which analyzes dependencies between a plurality of requirements belonging to any of a plurality of layers in product development process, the system further comprising:
    an input reception portion receiving information representing the dependency between two requirements belonging to adjacent layers and information representing the degree of influence of the two requirements on product development; and
    a dependency derivation portion deriving the dependency between two arbitrary selected requirements belonging to same layer from information representing the dependencies between each of the two requirements and other requirements received by the input reception portion and from information representing the degree of influence of the two arbitrary selected requirements, based on dependency derivation rules established in advance,
    wherein dependency derivation portion,
    (A) for all combinations of an arbitrary first requirement belonging to the first layer and an arbitrary second requirement belonging to the first layer, on all third requirement having values representing the dependency of the first requirement and the second requirement on a third requirement belonging to the second layer that are both equal to or above a predetermined strength,
    calculating by use of (value representing the degree of influence of the first requirement), (value representing the dependency of the first requirement on the third requirement), (value representing the degree of influence of the third requirement) and (value representing the degree of influence of the second requirement) on the basis of a formula stored in advance, and maintaining the greatest value among the achieved values as the value representing the dependency of the first requirement on the second requirement in a DSM table format;

(B) for all combinations between an arbitrary first requirement belonging to the first layer and an arbitrary third requirement belonging to the second layer, calculating by use of (value representing the dependency of the first requirement on the third requirement) and (value representing the degree of influence of the first requirement) on the basis of a formula stored in advance, and maintaining the achieved value as a value representing the dependency of the first requirement on the third requirement in a DSM table format;

(C) for all combination between an arbitrary third requirement belonging to the second layer and an arbitrary fourth requirement belonging to the second layer, on all first requirement belonging to the first layer, calculating by use of (value representing the degree of influence of the third requirement), (value representing the dependency of the first requirement on the third requirement), (value representing the degree of influence of the first requirement) and (value representing the dependency of the first requirement on the fourth requirement) on the basis of a formula stored in advance, and maintaining the greatest value among the achieved values as the value representing the dependency of the third requirement on the fourth requirement in a DSM table format;

(D) for all combinations between an arbitrary third requirement belonging to the second layer and an arbitrary first requirement belonging to the first layer, calculating by use of (value representing the degree of influence of the third requirement), (value representing the dependency of the first requirement on the third requirement) and (value representing the degree of influence of the first requirement) on the basis of a formula stored in advance, and maintaining the achieved value as the value representing the dependency of the third requirement on the first requirement in a DSM table format.

2. The product development process support system according to claim 1 further comprising an analyzer deciding the priority order of each requirement in the produce development process by changing the order of rows and columns of the DSM table using the value representing the dependency outputted by the dependency derivation portion, and partitioning a loop of dependency between requirements into small portions.

3. A product development process support method for analyzing dependencies between a plurality of requirements belonging to any of a plurality of layers in product development process, the method comprising:

receiving, via an input reception portion, information representing the dependency between two requirements belonging to adjacent layers and information representing the degree of influence of the two requirements on product development; and deriving, via a dependency derivation portion, the dependency between two arbitrary selected requirements belonging to same layer from information representing the dependencies between each of the two requirements and other requirements received by the input reception portion and from information representing the degree of influence of the two arbitrary selected requirements, based on dependency derivation rules established in advance and stored in memory, wherein the deriving includes:

(A) for all combinations of an arbitrary first requirement belonging to the first layer and an arbitrary second requirement belonging to the first layer, on all third requirement having values representing the dependency of the first requirement and the second requirement on a third requirement belonging to the second layer that are both equal to or above a predetermined strength, calculating by use of (value representing the degree of influence of the first requirement), (value representing the dependency of the first requirement on the third requirement), (value representing the degree of influence of the third requirement) and (value representing the degree of influence of the second requirement) on the basis of a formula stored in advance, and maintaining the greatest value among the achieved values as the value representing the dependency of the first requirement on the second requirement in a DSM table format;

(B) for all combinations between an arbitrary first requirement belonging to the first layer and an arbitrary third requirement belonging to the second layer, calculating by use of (value representing the dependency of the first requirement on the third requirement) and (value representing the degree of influence of the first requirement) on the basis of a formula stored in advance, and maintaining the achieved value as a value representing the dependency of the first requirement on the third requirement in a DSM table format;

(C) for all combination between an arbitrary third requirement belonging to the second layer and an arbitrary fourth requirement belonging to the second layer, on all first requirement belonging to the first layer, calculating by use of (value representing the degree of influence of the third requirement), (value representing the dependency of the first requirement on the third requirement), (value representing the degree of influence of the first requirement) and (value representing the dependency of the first requirement on the fourth requirement) on the basis of a formula stored in advance, and maintaining the greatest value among the achieved values as the value representing the dependency of the third requirement on the fourth requirement in a DSM table format;

(D) for all combinations between an arbitrary third requirement belonging to the second layer and an arbitrary first requirement belonging to the first layer, calculating by use of (value representing the degree of influence of the third requirement), (value representing the dependency of the first requirement on the third requirement) and (value representing the degree of influence of the first requirement) on the basis of a formula stored in advance, and maintaining the achieved value as the value representing the dependency of the third requirement on the first requirement in a DSM table format.

4. The produce development process support method according to claim 3, the method further comprising deciding, via an analyzer, the priority order of each requirement in the produce development process by changing the order of rows and columns of the DSM table using the value representing the outputted dependency by the dependency derivation portion, and partitioning, via an analyzer, a loop of dependency between requirements into small portions.

* * * * *